United States Patent
Peleg et al.

(10) Patent No.: US 8,185,571 B2
(45) Date of Patent: *May 22, 2012

(54) PROCESSOR FOR PERFORMING MULTIPLY-ADD OPERATIONS ON PACKED DATA

(75) Inventors: Alexander D. Peleg, Haifa (IL); Millind Mittal, South San Francisco, CA (US); Larry M. Mennemeier, Boulder Creek, CA (US); Benny Eitan, Haifa (IL); Carole Dulong, Saratoga, CA (US); Eiichi Kowashi, Ryugasaki (JP); Wolf Witt, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 572 days.

This patent is subject to a terminal disclaimer.

(21) Appl. No.: 12/409,275

(22) Filed: Mar. 23, 2009

(65) Prior Publication Data
US 2009/0265409 A1 Oct. 22, 2009

Related U.S. Application Data

(63) Continuation of application No. 10/861,167, filed on Jun. 4, 2004, now Pat. No. 7,509,367, which is a continuation of application No. 09/989,736, filed on Nov. 19, 2001, now Pat. No. 7,424,505, which is a continuation of application No. 08/522,067, filed on Aug. 31, 1995, now Pat. No. 6,385,634.

(51) Int. Cl.
*G06F 7/38* (2006.01)
(52) U.S. Cl. ........................................................ 708/524
(58) Field of Classification Search .................. 708/524
See application file for complete search history.

(56) References Cited

U.S. PATENT DOCUMENTS

| | | | |
|---|---|---|---|
| 3,641,736 | A | 2/1972 | Dwyer |
| 3,675,001 | A | 7/1972 | Singh |
| 3,711,692 | A | 1/1973 | Batcher |
| 3,723,715 | A | 3/1973 | Chen et al. |
| 3,900,724 | A | 8/1975 | McIver et al. |
| 3,941,990 | A | 3/1976 | Rabasse |
| 4,161,784 | A | 7/1979 | Cushing et al. |
| 4,344,151 | A | 8/1982 | White |
| 4,393,468 | A | 7/1983 | New |

(Continued)

FOREIGN PATENT DOCUMENTS

DE 3636106 4/1987

(Continued)

OTHER PUBLICATIONS

European Search Report for EP Application No. 06011060.8, 3 pgs.

(Continued)

*Primary Examiner* — Tan Mai
(74) *Attorney, Agent, or Firm* — Mnemoglyphics, LLC; Lawrence M. Mennemeier

(57) ABSTRACT

A method and apparatus for including in a processor instructions for performing multiply-add operations on packed data. In one embodiment, a processor is coupled to a memory. The memory has stored therein a first packed data and a second packed data. The processor performs operations on data elements in said first packed data and said second packed data to generate a third packed data in response to receiving an instruction. At least two of the data elements in this third packed data storing the result of performing multiply-add operations on data elements in the first and second packed data.

51 Claims, 7 Drawing Sheets

U.S. PATENT DOCUMENTS

| | | | |
|---|---|---|---|
| 4,418,383 A | 11/1983 | Doyle et al. |
| 4,498,177 A | 2/1985 | Larson |
| 4,542,476 A | 9/1985 | Nagafuji |
| 4,677,582 A | 6/1987 | Nagafuji |
| 4,707,800 A | 11/1987 | Montrone et al. |
| 4,760,525 A | 7/1988 | Webb |
| 4,760,545 A | 7/1988 | Inagami et al. |
| 4,761,753 A | 8/1988 | Izumisawa |
| 4,771,379 A | 9/1988 | Ando et al. |
| 4,811,269 A | 3/1989 | Hirose et al. |
| 4,876,660 A | 10/1989 | Owen et al. |
| 4,890,218 A | 12/1989 | Bram |
| 4,945,479 A | 7/1990 | Rusterholz et al. |
| 4,956,801 A | 9/1990 | Priem et al. |
| 4,969,118 A | 11/1990 | Montoye et al. |
| 4,972,362 A | 11/1990 | Elkind et al. |
| 4,985,848 A | 1/1991 | Pfeiffer et al. |
| 4,989,168 A | 1/1991 | Kuroda et al. |
| 5,001,662 A | 3/1991 | Baum |
| 5,032,865 A | 7/1991 | Schlunt |
| 5,047,975 A | 9/1991 | Patti et al. |
| 5,081,698 A | 1/1992 | Kohn |
| 5,095,457 A | 3/1992 | Jeong |
| 5,111,422 A | 5/1992 | Ullrich |
| 5,126,964 A | 6/1992 | Zurawski |
| 5,161,247 A | 11/1992 | Murakami et al. |
| 5,187,679 A | 2/1993 | Vassiliadis et al. |
| 5,189,636 A | 2/1993 | Patti et al. |
| 5,193,167 A | 3/1993 | Sites et al. |
| 5,210,711 A | 5/1993 | Rossmere et al. |
| 5,222,037 A | 6/1993 | Taniguchi |
| 5,227,994 A | 7/1993 | Ohki |
| 5,241,492 A | 8/1993 | Girardeau, Jr. |
| 5,241,493 A | 8/1993 | Chu et al. |
| 5,262,976 A | 11/1993 | Young et al. |
| 5,268,995 A | 12/1993 | Diefendorff et al. |
| 5,293,558 A | 3/1994 | Narita et al. |
| 5,303,355 A | 4/1994 | Gergen et al. |
| 5,311,508 A | 5/1994 | Buda et al. |
| 5,321,644 A | 6/1994 | Schibinger |
| 5,325,320 A | 6/1994 | Chiu |
| 5,327,369 A | 7/1994 | Ashkenazi |
| 5,327,543 A | 7/1994 | Miura et al. |
| 5,390,135 A | 2/1995 | Lee et al. |
| 5,408,581 A | 4/1995 | Suzuki et al. |
| 5,410,670 A | 4/1995 | Hansen et al. |
| 5,420,815 A | 5/1995 | Nix et al. |
| 5,426,598 A | 6/1995 | Hagihara |
| 5,426,783 A | 6/1995 | Norrie et al. |
| 5,442,799 A | 8/1995 | Murakami et al. |
| 5,457,805 A | 10/1995 | Nakamura |
| 5,487,022 A | 1/1996 | Simpson et al. |
| 5,487,159 A | 1/1996 | Byers et al. |
| 5,500,811 A | 3/1996 | Corry |
| 5,506,865 A | 4/1996 | Weaver, Jr. |
| 5,509,129 A | 4/1996 | Guttag et al. |
| 5,515,520 A | 5/1996 | Hatta et al. |
| 5,517,438 A | 5/1996 | Dao-Trong et al. |
| 5,528,529 A | 6/1996 | Seal |
| 5,541,865 A | 7/1996 | Ashkenazi |
| 5,576,983 A | 11/1996 | Shiokawa |
| 5,579,253 A | 11/1996 | Lee et al. |
| 5,590,365 A | 12/1996 | Ide et al. |
| 5,594,679 A | 1/1997 | Iwata |
| 5,606,677 A | 2/1997 | Balmer et al. |
| 5,636,351 A | 6/1997 | Lee |
| 5,642,306 A | 6/1997 | Mennemeier et al. |
| 5,651,121 A | 7/1997 | Davies |
| 5,673,427 A | 9/1997 | Brown et al. |
| 5,680,161 A | 10/1997 | Lehman et al. |
| 5,701,508 A | 12/1997 | Glew et al. |
| 5,712,797 A | 1/1998 | Descales et al. |
| 5,719,642 A | 2/1998 | Lee |
| 5,721,697 A | 2/1998 | Lee |
| 5,721,892 A | 2/1998 | Peleg et al. |
| 5,734,874 A | 3/1998 | Van Hook et al. |
| 5,737,537 A | 4/1998 | Gardos et al. |
| 5,740,037 A | 4/1998 | McCann et al. |
| 5,742,529 A | 4/1998 | Mennemeier et al. |
| 5,742,840 A | 4/1998 | Hansen et al. |
| 5,765,037 A | 6/1998 | Morrison et al. |
| 5,778,419 A | 7/1998 | Hansen et al. |
| 5,790,208 A | 8/1998 | Kwak et al. |
| 5,793,661 A | 8/1998 | Dulong et al. |
| 5,793,879 A | 8/1998 | Benn et al. |
| 5,793,900 A | 8/1998 | Nourbakhsh et al. |
| 5,794,060 A | 8/1998 | Hansen et al. |
| 5,794,061 A | 8/1998 | Hansen et al. |
| 5,802,336 A | 9/1998 | Peleg et al. |
| 5,805,913 A | 9/1998 | Guttag et al. |
| 5,806,049 A | 9/1998 | Petruzzi |
| 5,809,321 A | 9/1998 | Hansen et al. |
| 5,819,101 A | 10/1998 | Peleg et al. |
| 5,822,603 A | 10/1998 | Hansen et al. |
| 5,835,392 A | 11/1998 | Dulong et al. |
| 5,841,676 A | 11/1998 | Ali et al. |
| 5,852,473 A | 12/1998 | Horne et al. |
| 5,852,726 A | 12/1998 | Lin et al. |
| 5,859,997 A | 1/1999 | Peleg et al. |
| 5,862,067 A | 1/1999 | Mennemeier et al. |
| 5,865,752 A | 2/1999 | Seyed-Bolorforosh et al. |
| 5,870,619 A | 2/1999 | Wilkinson et al. |
| 5,876,342 A | 3/1999 | Chen et al. |
| 5,880,979 A | 3/1999 | Mennemeier et al. |
| 5,880,983 A | 3/1999 | Elliott et al. |
| 5,883,824 A | 3/1999 | Lee et al. |
| 5,884,071 A | 3/1999 | Kosaraju |
| 5,884,089 A | 3/1999 | Orian et al. |
| 5,907,842 A | 5/1999 | Mennemeier et al. |
| 5,909,552 A | 6/1999 | Jensen et al. |
| 5,936,872 A | 8/1999 | Fischer et al. |
| 5,938,756 A | 8/1999 | Van Hook et al. |
| 5,946,405 A | 8/1999 | Kim et al. |
| 5,953,241 A | 9/1999 | Hansen et al. |
| 5,983,256 A | 11/1999 | Peleg et al. |
| 5,983,257 A | 11/1999 | Dulong |
| 6,006,318 A | 12/1999 | Hansen et al. |
| 6,018,351 A | 1/2000 | Mennemeier et al. |
| 6,026,483 A | 2/2000 | Oberman et al. |
| 6,035,316 A | 3/2000 | Peleg et al. |
| 6,035,387 A | 3/2000 | Hsu et al. |
| 6,041,403 A | 3/2000 | Parker et al. |
| 6,058,408 A | 5/2000 | Fischer et al. |
| 6,122,725 A | 9/2000 | Roussel et al. |
| 6,154,831 A | 11/2000 | Thayer et al. |
| 6,178,482 B1 | 1/2001 | Sollars |
| 6,192,467 B1 | 2/2001 | Abdallah et al. |
| 6,230,253 B1 | 5/2001 | Roussel et al. |
| 6,230,257 B1 | 5/2001 | Roussel et al. |
| 6,233,671 B1 | 5/2001 | Abdallah et al. |
| 6,237,016 B1 | 5/2001 | Fischer et al. |
| 6,260,137 B1 | 7/2001 | Fleck et al. |
| 6,295,599 B1 | 9/2001 | Hansen et al. |
| 6,370,558 B1 | 4/2002 | Guttag et al. |
| 6,378,060 B1 | 4/2002 | Hansen et al. |
| 6,385,634 B1 | 5/2002 | Peleg |
| 6,418,529 B1 | 7/2002 | Roussel |
| 6,470,370 B2 | 10/2002 | Fischer et al. |
| 6,502,117 B2 | 12/2002 | Golliver et al. |
| 6,584,482 B1 | 6/2003 | Hansen et al. |
| 6,643,765 B1 | 11/2003 | Hansen et al. |
| 6,725,356 B2 | 4/2004 | Hansen et al. |
| 7,085,795 B2 | 8/2006 | Debes et al. |
| 2002/0059355 A1 | 5/2002 | Peleg et al. |
| 2004/0220992 A1 | 11/2004 | Peleg et al. |

FOREIGN PATENT DOCUMENTS

| | | |
|---|---|---|
| DE | 19914617 | 10/1999 |
| EP | 0308124 | 3/1989 |
| FR | 2563349 | 10/1985 |
| GB | 2339040 | 1/2000 |
| JP | 3268024 | 3/1990 |
| JP | 6266554 | 9/1994 |
| JP | 08022451 | 1/1996 |
| WO | WO-9708608 | 3/1997 |
| WO | WO-9708610 | 3/1997 |
| WO | WO-9722921 | 6/1997 |

| | | |
|---|---|---|
| WO | WO-9722923 | 6/1997 |
| WO | WO-9722924 | 6/1997 |
| WO | WO-9723821 | 7/1997 |
| WO | WO-9950740 | 10/1999 |

OTHER PUBLICATIONS

"Complaint", In the United States District Court for the District of Delaware, In the matter of *Transmeta v. Intel Corporation*, (Oct. 11, 2006), pp. 1-7.
"EP96930495", *EPO Search Report*, (Nov. 18, 1999), p. 2.
"Final Joint Claim Construction Chart", In the United States District Court for the District of Delaware, In the Matter of *Transmeta Corporation v. Intel Corporation*, C.A. No. 06-633 (GMS), (Oct. 10, 2007), pp. 1-215.
"First Amended Complaint", In the United States District Court for the District of Delaware, In the matter of *Transmeta Corporation v. Intel Corporation*, C.A. No. 06-663 (GMS), (Dec. 12, 2006), pp. 1-8.
"Intel Corporation's Answer, Affirmative Defenses, and Counterclaims to Transmeta's First Amended Complaint", In the United States District Court for the District of Delaware, In the matter of *Transmeta Corporation v. Intel Corporation*, Civil Action No. 06-663-GMS, (Jan. 9, 2007), pp. 1-27.
"Intel Corporation's Opening Claim Construction Brief", In the United States District Court for the District of Delaware, In the matter or *Transmeta Corporation v. Intel Corporation*, C.A. No. 06-663-GMS, (Oct. 19, 2007, pp. 1-76.
"Intel Corporation's Responses to Transmeta's First Set of Interrogatories to Intel Corporation (Nos. 1-24)", In the United States District Court for the District of Delaware, In the matter of *Transmeta Corporation v. Intel Corporation*, C.A. No. 06-663-GMS, (May 18, 2007), pp. 1-132.
"Intel Corporation's Supplemental Responses to Transmeta Interrogatory Nos. 8, 9, 12, 19, and 21-23", In the United States District Court for the District of Delaware, In the matter or *Transmeta Corporation v. Intel Corporation*, C.A. No. 06-663-GMS, (Aug. 23, 2007), pp. 1-27.
"MIPS V Instruction Set", MIPS V Specification, Rev. 1.0, pp. B1-37.
"Transmeta Corporation's Amended and Supplemental Responses to Intel Corporation's First Set of Interrogatories (Nos. 1, 3, 4, 5, 8, 13, 15)" (Redacted Version), In the United States District Court for the District of Delaware, In the matter or *Transmeta Corporation v. Intel Corporation*, C.A. No. 06-633-GMS, (Aug. 23, 2007), 84 pages (including Exhibits 15-18 totaling 46 pages).
"Transmeta Corporation's Opening Claim Construction Brief", In the United States District Court for the District of Delaware, In the matter of *Transmeta Corporation v. Intel Corporation*, C.A. No. 06-633-GMS, (Oct. 19, 2007), pp. 1-66.
"Transmeta Corporation's Reply to Intel Corporation's Counterclaims to the First Amended Complaint", In the United States District Court for the District of Delaware, In the matter of *Transmeta Corporation v. Intel Corporation*, (Feb. 28, 2007), pp. 1-20.
"Transmeta Corporation's Responses to Intel Corporation's First Set of Interrogatories (Nos. 1-20)", In the United States District Court for the District of Delaware, In the matter of *Transmeta Corporation v. Intel Corporation*, Redacted, (May 21, 2007), 42 pages.
U.S. Appl. No. 10/610,831, "Final Office Action", (Feb. 28, 2007), pp. 1-6.
U.S. Appl. No. 10/610,831, "Office Action", (Aug. 4, 2006), pp. 1-7.
U.S. Appl. No. 10/611,621, "Office Action", (Aug. 4, 2006), pp. 1-6.
Abbott, Curtis , et al., "Broadband Algorithms with the MicroUnity Mediaprocessor", *Proceedings of COMPCON '96*, (1996), pp. 349-354.
Advanced Micro Devices, Inc., "AMD-3D Technology Manual", (Feb. 1998), pp. i-x, 1-58.
Bipolar Integrated Technology, "BIT Preliminary", *B3110/B3120; B2110/B2120 Floating Point Chip Set*, pp. 1-40.
Case, Brian, "Philips Hopes to Displace DSPs with VLIW", *Microprocessor Report*, (Dec. 1994), pp. 12-15.
Convex Computer Corporation, "C4/XA Architecture Overview", *Convex Technical Marketing*, (Feb. 1994), 279 pages.
Convex Computer Corporation, "Convex C3400 Supercomputer System Overview", *Revision 2.01*, (Jul. 24, 1991), 55 pages.
Convex Computer Corporation, "Saturn Architecture Specification", (Apr. 29, 1993), 88 pages.
Elkind, Bob , et al., "A SUB 10 nS Bipolar 64 Bit Integrated/Floating Point Processor Implemented on Two Circuits", *IEEE 1987 BCTM*, (1987), pp. 101-104.
Farmwald, Paul M., "High Bandwidth Evaluation of Elementary Functions, S-1 Project", *IEEE*, (1981), pp. 139-142.
Farmwald, P. M., "On the Design of High Performance Digital Arithmetic Units", *UCRL-53190*, (Aug. 1981), pp. i-viii & 1-95.
Grimes, Jack , et al., "64-Bit Processor, The Intel i860 64 Bit Processor: A General Purpose CPU with 3D Graphics Capabilities", (Jul. 1989), pp. 85-94.
Gwennap, Linley , "New PA-RISC Processor Decodes MPEG Video", *Microprocessor Report*, (Jan. 1994), pp. 16-17.
Hansen, Craig , "Architecture of a Broadband Mediaprocessor", *MicroUnity Systems Engineering, Inc.*, Proceedings of COMPCON '96, (1996), pp. 334-340.
Hansen, Craig , "Terpsichore System Architecture", *MicroUnity Systems Engineering, Inc.*, (Aug. 2, 1995), 380 pages.
Hayes, Raymond , et al., "MicroUnity Software Development Environment", *Proceedings of COMPCON '96*, (1996), pp. 341-348.
Hewlett Packard, "64-Bit and Multimedia Extensions in the PA-RISC 2.0 Architecture", (Jul. 17, 1997), pp. 1-18.
IBM, "TDB: Double Speed, Single Precision Vector Register Organization Using Double Port Chips", (Feb. 1981), pp. 1-6.
IMB, Inc., "The PowerPC Architecture", (May 1994), 533 pages.
Ide, Nobuhiro , et al., "A 320-MFLOPS CMOS Floating-Point Processing Unit for Superscalar Processors", *IEEE Journal of Solid State Circuits*, vol. 28, No. 3, (Mar. 1993), pp. 352-361.
Iino, Hideyuki , et al., "ISSCC 92 Session 6 / Microprocessors / TA 6.5: A 289MFLOPS Single-Chip Supercomputer", *1992 IEEE International Solid State Circuits Conference*, (1992), pp. 112-113.
Intel Corporation, "i860 Microprocessor Family Programmer's Reference Manual", (1992), Ch. 1, 3, 8 & 12.
Intel Corporation, "IA-32 Intel Architecture Software Developer's Manual", *Volume 1: Basic Architecture*, www.intel.com, order No. 245470, (2001), 418 pages.
Intel Corporation, "IA-32 Intel Architecture Software Developer's Manual", *Volume 3: System Programming Guide*, www.intel.com, order No. 245472, (2001), 688 pages.
Intel Corporation, "Intel 80386 Programmer's Reference Manual", (1986), 421 pages.
Intel Corporation, "Intel Architecture Software Developer's Manual", *Volume 2: Instruction Set Reference*, (2001), 854 pages.
Intel Corporation, "Pentium II Processor Developer's Manual", www.intel.com.order_no._243502-001, (Oct. 1997), 226 pages.
Intel Corporation, "Pentium Processor Family Developer's Manual", www.intel.com, (1997), 609 pages.
Intel Corporation, "Pentium Processor User's Manual", *Volume 3: Architecture and Programming Manual*, (1993), Ch. 1, 3-4, 6, 8, & 18.
Intel Corporation, "Willamette** Processor Software Developer's Guide", http://developer.intel.com/design/processor/index.htm, (Feb. 2000), 314 pages.
Kawakami, Yuichi , et al., "LSI Applications: A Single-Chip Digital Signal Processor for Voiceband Applications", *Solid State Circuits Conference, Digest of Technical Papers, IEEE International*, (1980), 3 pages.
Killian, Earl , "MIPS Extension for Digital Media", *Silicon Graphics, Inc.*, pp. 1-10.
Kohn, Les , et al., "Introducing the Intel i860 64 Bit Microprocessor", *Intel Corporation*, (Aug. 1989), pp. 15-30.
Kohn, L. , et al., "The Visual Instruction Set (VIS) in UltraSPARC", *SPARC Technology Business—Sun Microsystems, Inc.*, (1995), pp. 462-469.
Lamport, Leslie , "Multiple Byte Processing With Full-Word Instructions", *ACM*, (1975), pp. 471-475.
Lawrence Livermore Laboratory, "S-1 Uniprocessor Architecture", (Apr. 21, 1983), 386 pages.
Lawrence Livermore Laboratory, "Volume I: Architecture—The 1979 Annual Report—The S-1 Project", (1979), 443 pages.
Lawrence Livermore Laboratory, "Volume II: Hardware—The 1979 Annual Report—The S-1 Project", (1979), 366 pages.

Lee, Ruby B., "Accelerating Multimedia with Enhanced Microprocessors", *Hewlett Packard. IEEE Micro*, (Apr. 1995), pp. 22-32.

Lee, Ruby B., "Realtime MPEG Video via Software Decompression on a PA-RISC Processor", *1995 IEEE*, (1995), pp. 186-192.

Leibowitz, Bob, et al., "System Design: ECL gains ground in battle against CMOS", *Computer Design*, (Apr. 1, 1987), pp. 91-95.

Levinthal, Adam, et al., "Chap-A SIMD Graphics Processor", *Computer Graphics Project, Lucasfilm Ltd.*, (1984), pp. 77-82.

Levinthal, Adam, et al., "Parallel Computers for Graphics Applications", *Pixar*, San Rafael, CA, (1987), pp. 193-198.

Manferdelli, John L., et al., "Signal Processing Aspects of the S-1 Multiprocessor Project", *UCRL-84658*, (Jul. 28, 1980), pp. 1-8.

Margulis, Neal, "i860 Microprocessor Architecture", *McGraw Hill, Inc.*, (1990), Ch. 6-8 & 10-11.

Margulis, Neal, "i860 Microprocessor Architecture", *McGraw Hill, Inc.*, (1990), Ch. 1-3 (86 pages).

MIPS Technologies, Inc., "MIPS Extension for Digital Media with 3D", (Mar. 12, 1997), 30 pages.

Motorola, Inc., "Errata to MC88110 Second Generation RISC Microprocessor User's Manual", (1992), pp. 1-11.

Motorola, Inc., "MC88110 Programmer's Reference Guide", (1992), pp. 1-4.

Motorola, Inc., "MC88110 Second Generation RISC Microprocessor User's Manual", MC8110UM/AD, (1991), 619 pages.

PCT/US96/12799, "Search Report", (Nov. 26, 1996), 1 page.

Philips Electronics, "TriMedia TM1000 Preliminary Data Book", (1997), 496 pages.

Samsung Electronics, "21164 Alpha Microprocessor Data Sheet", (1997), 121 pages.

Santoro, Mark R., "Design and Clocking of VLSI Multipliers", *Technical Report No. CSL-TR-89-397*, (Oct. 1989), pp. i-xiii and 1-118.

Santoro, Mark, et al., "Session II: High-Speed Microprocessor", *A Pipelined 64X64b Interactive Array Multiplier*, IEEE International Solid State Circuits Conference, 1988, pp. 36-37 & 290.

Santoro, Mark R., et al., "SPIM: A Pipelined 64×64 bit Interactive Multiplier", *IEEE Journal of Solid-State Circuits*, vol. 24, No. 2, (Apr. 1989), pp. 487-493.

Shipnes, J., "Graphics Processing with the 88110 RISC Microprocessor", *IEEE*, (1992), pp. 169-174.

Silicon Graphics, Inc., "MIPS Digital Media Extension", pp. C1-C40.

Silicon Graphics, Inc., "Silicon Graphics Introduces Compact MIPS@ RISC Microprocessor Code for High Performance at a Low Cost", www.sgi.com, (Oct. 21, 1996), pp. 1-2.

Silicon Graphics, Inc., "Silicon Graphics Introduces Enhanced MIPS Architecture to Lead the Interactive Digital Revolution", (Oct. 21, 1996), pp. 1-2.

Spaderna, D., et al., "An Integrated Floating Point Vector Processor for DSP and Scientific Computing", *SHARP Microelectrinics Technology, Inc. IEEE*, (1989), pp. 8-13.

Sun Microsystems, Inc., "Real-Time MPEG2 Decode with the Visual Instrustion Set (VIS)", *ULTRASPARC and New Media Support*, (1996), pp. 1-8.

Sun Microsystems, Inc., "The ULTRASPARC Processor—Technology White Paper", (1995), 35 pages.

Sun Microsystems, Inc., "The VIS Instruction Set", (1997), pp. 1-2.

Sun Microsystems, Inc., "The Visual Instruction Set (VIS): On Chip Support for New-Media Processing", *ULTRASPARC*, (1996), pp. 1-7.

Sun Microsystems, Inc., "Turbocharges Network Operations on New Media Computing", *ULTRASPARC*, (1996), pp. 1-5.

Sun Microsystems, Inc., "Ultra Port Archictecture (UPA): The New-Media System Architecture", *ULTRASPARC*, (1996), pp. 1-4.

Sun Microsystems, Inc., "UltraSPARC Multimedia Capabilities On-Chip Support for Real-Time Video and Advanced Graphics", *SPACR Technology Business*, (Sep. 1994), 8 pages.

Sun Microsystems, Inc., "Visual Instruction Set (VIS) User's Guide", *Version 1.1*, (Mar. 1997), 130 pages.

Swartzlander Jr., Earl, et al., "Proceedings: 11th Symposium on Computer Arithmetic", Windsor Ontario, (Jun. 29-Jun. 2, 1993), pp. 171-178.

Texas Instruments, "TMS320C2X User's Guide", (1993), pp. 3:2-3:11; 3:28-3:34; 4:1-4:22; 4:41; 4:103; 4:119-4:120; 4:122; 4:150-4:151.

Transmeta Corporation, "Transmeta Announces Settlement of Patent Litigation, Technology Transfer and License Agreement with Intel", *Press Release*, printed from the Internet site (http://investor.transmeta.com/releasedetail.cfm?ReleaseID=271024), (Oct. 24, 2007), 1 page.

Undy, Steve, et al., "A Low-Cost Graphics and Multimedia Workstation Chip Set", *IEEE Micro*, (1994), pp. 10-22.

Wang, Yulun, et al., "A Processor Architecture for 3D Graphics", *IEEE Computer Graphics & Applications*, (Sep. 1992), pp. 96-105.

Wang, Yulan, et al., "A Processor Architecture for 3D Graphics Calculations", *Computer Motion, Inc.*, (Sep. 1992), pp. 1-23.

Wang, Yulun, et al., "The 3DP: A Processor Architecture for Three-Dimensional Applications", *IEEE*, (Jan. 1992), pp. 25-36.

Widdoes Jr., L. C., "The S-1 Project: Developing High-Performance Digital Computers", *IEEE Computer Society*, (Dec. 11, 1979), pp. 1-10.

PROCESSOR FOR PERFORMING MULTIPLY-ADD OPERATIONS ON PACKED DATA

CROSS-REFERENCE TO RELATED APPLICATION

This patent application is a Continuation of application Ser. No. 10/861,167, filed Jun. 4, 2004, now U.S. Pat. No. 7,509,367, which is a continuation of application Ser. No. 09/989,736, filed Nov. 19, 2001, now U.S. Pat. No. 7,424,505, which is a continuation of application Ser. No. 08/522,067, filed Aug. 31, 1995, now U.S. Pat. No. 6,385,634. This is related to application Ser. No. 08/960,413, titled "Apparatus for Performing Multiply-Add Operations on Packed Data," filed Oct. 29, 1997, now U.S. Pat. No. 5,983,256, which is a Continuation of Ser. No. 08/551,196, filed Oct. 31, 1995, abandoned, which is a Continuation of Ser. No. 08/522,067, filed Aug. 31, 1995, now U.S. Pat. No. 6,385,634. This is related to application Ser. No. 08/606,212, titled "Apparatus for Performing Multiply-Add Operations on Packed Data," filed Feb. 23, 1996, now U.S. Pat. No. 6,035,316, which is a CIP of Ser. No. 08/522,067, filed Aug. 31, 1995, now U.S. Pat. No. 6,385,634. This is related to application Ser. No. 08/554,625, titled "An Apparatus for Performing Multiply-Subtract Operations on Packed Data," filed Nov. 6, 1995, now U.S. Pat. No. 5,721,892, which is a Continuation of Ser. No. 08/521,803, filed Aug. 31, 1995, abandoned.

BACKGROUND OF THE INVENTION

1. Field of Invention

In particular, the invention relates to the field of computer systems. More specifically, the invention relates to the area of packed data operations.

2. Description of Related Art

In typical computer systems, processors are implemented to operate on values represented by a large number of bits (e.g., 64) using instructions that produce one result. For example, the execution of an add instruction will add together a first 64-bit value and a second 64-bit value and store the result as a third 64-bit value. However, multimedia applications (e.g., applications targeted at computer supported cooperation (CSC—the integration of teleconferencing with mixed media data manipulation), 2D/3D graphics, image processing, video compression/decompression, recognition algorithms and audio manipulation) require the manipulation of large amounts of data which may be represented in a small number of bits. For example, graphical data typically requires 8 or 16 bits and sound data typically requires 8 or 16 bits. Each of these multimedia application requires one or more algorithms, each requiring a number of operations. For example, an algorithm may require an add, compare and shift operation.

To improve efficiency of multimedia applications (as well as other applications that have the same characteristics), prior art processors provide packed data formats. A packed data format is one in which the bits typically used to represent a single value are broken into a number of fixed sized data elements, each of which represents a separate value. For example, a 64-bit register may be broken into two 32-bit elements, each of which represents a separate 32-bit value. In addition, these prior art processors provide instructions for separately manipulating each element in these packed data types in parallel. For example, a packed add instruction adds together corresponding data elements from a first packed data and a second packed data. Thus, if a multimedia algorithm requires a loop containing five operations that must be performed on a large number of data elements, it is desirable to pack the data and perform these operations in parallel using packed data instructions. In this manner, these processors can more efficiently process multimedia applications.

However, if the loop of operations contains an operation that cannot be performed by the processor on packed data (i.e., the processor lacks the appropriate instruction), the data will have to be unpacked to perform the operation. For example, if the multimedia algorithm requires an add operation and the previously described packed add instruction is not available, the programmer must unpack both the first packed data and the second packed data (i.e., separate the elements comprising both the first packed data and the second packed data), add the separated elements together individually, and then pack the results into a packed result for further packed processing. The processing time required to perform such packing and unpacking often negates the performance advantage for which packed data formats are provided. Therefore, it is desirable to incorporate in a computer system a set of packed data instructions that provide all the required operations for typical multimedia algorithms. However, due to the limited die area on today's general purpose microprocessors, the number of instructions which may be added is limited. Therefore, it is desirable to invent instructions that provide both versatility (i.e. instructions which may be used in a wide variety of multimedia algorithms) and the greatest performance advantage.

One prior art technique for providing operations for use in multimedia algorithms is to couple a separate digital signaling processor (DSP) to an existing general purpose processor (e.g., The Intel® 486 manufactured by Intel Corporation of Santa Clara, Calif.). The general purpose processor allocates jobs that can be performed using packed data (e.g., video processing) to the DSP.

One such prior art DSP includes a multiply accumulate instruction that adds to an accumulation value the results of multiplying together two values. (see Kawakami, Yuichi, et al., "A Single-Chip Digital Signal Processor for Voiceband Applications", IEEE International Solid-State Circuits Conference, 1980, pp. 40-41). An example of the multiply accumulate operation for this DSP is shown below in Table 1, where the instruction is performed on the data values $A_1$ and $B_1$ accessed as Source1 and Source2, respectively.

TABLE 1

| Multiply-Accumulate Source1, Source2 | |
|---|---|
| $A_1$ | Source1 |
| $B_1$ | Source2 |
| = | |
| $A_1B_1$ + Accumulation Value | Result1 |

One limitation of this prior art instruction is its limited efficiency—i.e., it only operates on 2 values and an accumulation value. For example, to multiply and accumulate two sets of 2 values requires the following 2 instructions performed serially: 1) multiply accumulate the first value from the first set, the first value from the second set, and an accumulation value of zero to generate an intermediate accumulation value; 2) multiply accumulate the second value from the first set, the second value from the second set, and the intermediate accumulation value to generate the result.

Another prior art DSP includes a multiply accumulate instruction that operates on two sets of two values and an accumulation value (See "Digital Signal Processor with Parallel Multipliers", U.S. Pat. No. 4,771,470—referred to herein as the "Ando et al." reference). An example of the multiply accumulate instruction for this DSP is shown below in Table 2, where the instruction is performed on the data values $A_1$, $A_2$, $B_1$ and $B_2$ accessed as Source1-4, repectively.

TABLE 2

| Source1 | Source3 |
|---|---|
| $A_1$ | $A_2$ |
| Multiply Accumluate | |
| Source2 | Source4 |
| $B_1$ | $B_2$ |
| = | Result1 |
| $A_1 \cdot B_1 + A_2 \cdot B_2$ + Accumulation Value | |

Using this prior art technique, two sets of 2 values are multiplied and then added to an accumulation value in one instruction.

This multiply accumulate instruction has limited versatility because it always adds to the accumulation value. As a result, it is difficult to use the instruction for operations other than multiply accumulate. For example, the multiplication of complex numbers is commonly used in multimedia applications. The multiplication of two complex number (e.g., $r_1$ $i_1$ and $r_2$ $i_2$) is performed according to the following equation:

$$\text{Real Component} = r_1 \cdot r_2 - i_1 \cdot i_2$$

$$\text{Imaginary Component} = r_1 \cdot i_2 + r_2 \cdot i_1$$

This prior art DSP cannot perform the function of multiplying together two complex numbers using one multiply accumulate instruction.

The limitations of this multiply accumulate instruction can be more clearly seen when the result of such a calculation is needed in a subsequent multiplication operation rather than an accumulation. For example, if the real component were calculated using this prior art DSP, the accumulation value would need to be initialized to zero in order to correctly compute the result. Then the accumulation value would again need to be initialized to zero in order to calculate the imaginary component. To perform another complex multiplication on the resulting complex number and a third complex number (e.g., r3, i3), the resulting complex number must be rescaled and stored into the acceptable memory format and the accumulation value must again be initialized to zero. Then, the complex multiplication can be performed as described above. In each of these operations the ALU, which is devoted to the accumulation value, is superfluous hardware and extra instructions are needed to re-initialize this accumulation value. These extra instructions would otherwise have been unnecessary.

A further limitation of this prior art technique is that the data must be accessed through expensive multi-ported memory. This is because the multipliers are connected directly with data memories. Therefore the amount of parallelism which can be exploited is limited to a small number by the cost of the interconnection, and the fact that this interconnection is not decoupled from the instruction.

The Ando, et al. reference also describes that an alternative to this expensive interconnection is to introduce a delay for each subsequent pair of data to be multiplied. This solution diminishes any performance advantages to those provided by the solution previously shown in Table 1.

Furthermore, the notion of multi-ported memory or of pipelined accesses to memory entails the use of multiple addresses. This explicit use of one address per datum, clearly demonstrates that the critical notion of packed data is not employed in this prior art.

SUMMARY OF THE INVENTION

A method and apparatus for including in a processor instructions for performing multiply-add operations on packed data is described. In one embodiment, a processor is coupled to a memory. The memory has stored therein a first packed data and a second packed data. The processor performs operations on data elements in the first packed data and the second packed data to generate a third packed data in response to receiving an instruction. At least two of the data elements in this third packed data storing the result of performing multiply-add operations on data elements in the first and second packed data.

BRIEF DESCRIPTION OF THE DRAWINGS

The invention is illustrated by way of example, and not limitation, in the figures. Like references indicate similar elements.

DETAILED DESCRIPTION

Figure 1:
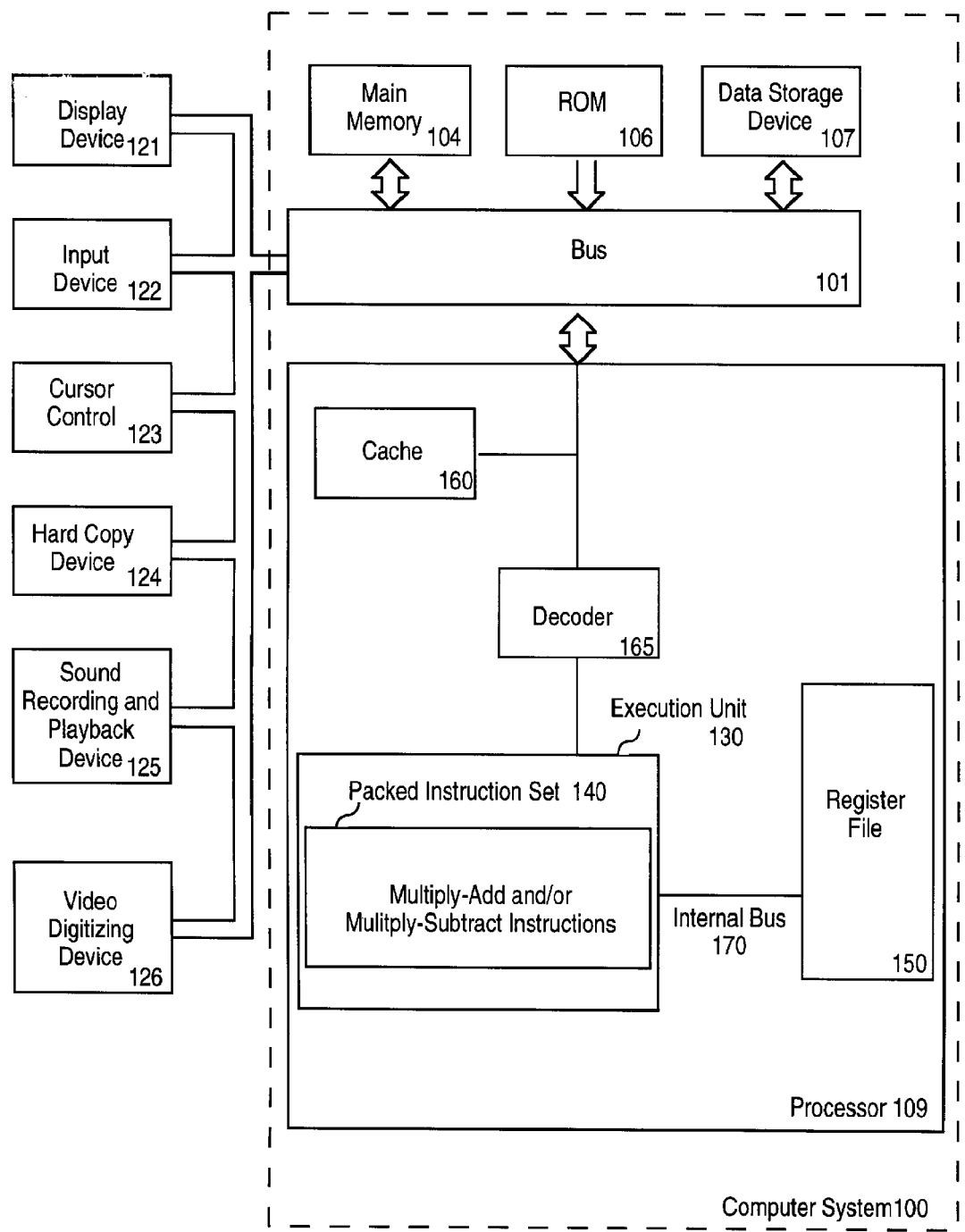
FIG. 1 illustrates an exemplary computer system according to one embodiment of the invention.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Definitions

To provide a foundation for understanding the description of the embodiments of the invention, the following definitions are provided.

Bit X through Bit Y:
  defines a subfield of binary number. For example, bit six through bit zero of the byte $00111010_2$ (shown in base two) represent the subfield $111010_2$. The '$_2$' following a binary number indicates base 2. Therefore, $1000_2$ equals $8_{10}$, while $F_{16}$ equals $15_{10}$.
Rx: is a register. A register is any device capable of storing and providing data. Further functionality of a register is described below. A register is not necessarily, included on the same die or in the same package as the processor.
SRC1, SRC2, and DEST:
  identify storage areas (e.g., memory addresses, registers, etc.)
Source1-i and Result1-i:
  represent data.

Overview

This application describes a method and apparatus for including in a processor instructions for performing multiply-add and multiply-subtract operations on packed data. In one embodiment, two multiply-add operations are performed using a single multiply-add instruction as shown below in Table 3a and Table 3b—Table 3a shows a simplified representation of the disclosed multiply-add instruction, while Table 3b shows a bit level example of the disclosed multiply-add instruction.

TABLE 3a

| Multiply-Add Source1, Source2 | | | | |
|---|---|---|---|---|
| $A_1$ | $A_2$ | $A_3$ | $A_4$ | Source1 |
| $B_1$ | $B_2$ | $B_3$ | $B_4$ | Source2 |
| = | | | | |
| $A_1B_1 + A_2B_2$ | | $A_3B_3 + A_4B_4$ | | Result1 |

TABLE 3b

| 11111111 11111111 | 11111111 00000000 | 01110001 11000111 | 01110001 11000111 |
|---|---|---|---|
| 3 | 2 | 1 | 0 |
| Multiply | Multiply | Multiply | Multiply |
| 00000000 00000000 | 00000000 00000001 | 10000000 00000000 | 00000100 00000000 |
| ↓ | ↓ | ↓ | ↓ |
| 32-Bit Intermediate Result 4 | 32-Bit Intermediate Result 3 | 32-Bit Intermediate Result 2 | 32-Bit Intermediate Result 1 |
| Add | | Add | |
| 11111111 11111111   11111111 00000000 | | 11001000 11100011   10011100 00000000 | |
| 1 | | 0 | |

Thus, the described embodiment of the multiple-add instruction multiplies together corresponding 16-bit data elements of Source1 and Source2 generating four 32-bit intermediate results. These 32-bit intermediate results are summed by pairs producing two 32-bit results that are packed into their respective elements of a packed result. As further described later, alternative embodiment may vary the number of bits in the data elements, intermediate results, and results. In addition, alternative embodiment may vary the number of data elements used, the number of intermediate results generated, and the number of data elements in the resulting packed data. The multiply-subtract operation is the same as the multiply-add operation, except the adds are replaced with subtracts. The operation of an example multiply-subtract instruction is shown below in Table 4.

TABLE 4

| Multiply-Subtract Source1, Source2 | | | | |
|---|---|---|---|---|
| $A_1$ | $A_2$ | $A_3$ | $A_4$ | Source1 |
| $B_1$ | $B_2$ | $B_3$ | $B_4$ | Source2 |
| = | | | | |
| $A_1B_1 - A_2B_2$ | | $A_3B_3 - A_4B_4$ | | Result1 |

Of course, alternative embodiments may implement variations of these instructions. For example, alternative embodiments may include an instruction which performs at least one multiply-add operation or at least one multiply-subtract operation. As another example, alternative embodiments may include an instruction which performs at least one multiply-add operation in combination with at least one multiply-subtract operation. As another example, alternative embodiments may include an instruction which perform multiply-add operation(s) and/or multiply-subtract operation(s) in combination with some other operation.

Computer System

FIG. 1 illustrates an exemplary computer system 100 according to one embodiment of the invention. Computer system 100 includes a bus 101, or other communications hardware and software, for communicating information, and a processor 109 coupled with bus 101 for processing information. Processor 109 represents a central processing unit of any type of architecture, including a CISC or RISC type architecture. Computer system 100 further includes a random access memory (RAM) or other dynamic storage device (referred to as main memory 104), coupled to bus 101 for storing information and instructions to be executed by processor 109. Main memory 104 also may be used for storing temporary variables or other intermediate information during execution of instructions by processor 109. Computer system 100 also includes a read only memory (ROM) 106, and/or other static storage device, coupled to bus 101 for storing static information and instructions for processor 109. Data storage device 107 is coupled to bus 101 for storing information and instructions.

FIG. 1 also illustrates that processor 109 includes an execution unit 130, a register file 150, a cache 160, a decoder 165, and an internal bus 170. Of course, processor 109 contains additional circuitry which is not necessary to understanding the invention.

Execution unit 130 is used for executing instructions received by processor 109. In addition to recognizing instructions typically implemented in general purpose processors, execution unit 130 recognizes instructions in packed instruction set 140 for performing operations on packed data formats. Packed instruction set 140 includes instructions for supporting multiply-add and/or multiply-subtract operations. In addition, packed instruction set 140 may also include instructions for supporting a pack operation, an unpack operation, a packed add operation, a packed subtract operation, a packed multiply operation, a packed shift operation, a packed compare operation, a population count operation, and a set of packed logical operations (including packed AND, packed ANDNOT, packed OR, and packed XOR) as described in "A Set of Instructions for Operating on Packed Data," filed on Aug. 31, 1995, Ser. No. 08/521,360.

Execution unit 130 is coupled to register file 150 by internal bus 170. Register file 150 represents a storage area on processor 109 for storing information, including data. It is understood that one aspect of the invention is the described instruction set for operating on packed data. According to this aspect of the invention, the storage area used for storing the packed data is not critical. However, one embodiment of the register file 150 is later described with reference to FIG. 2. Execution unit 130 is coupled to cache 160 and decoder 165. Cache 160 is used to cache data and/or control signals from, for example, main memory 104. Decoder 165 is used for decoding instructions received by processor 109 into control signals and/or microcode entry points. In response to these control signals and/or microcode entry points, execution unit 130 performs the appropriate operations. For example, if an add instruction is received, decoder 165 causes execution unit 130 to perform the required addition; if a subtract instruction is received, decoder 165 causes execution unit 130 to perform the required subtraction; etc. Decoder 165 may be implemented using any number of different mechanisms (e.g., a look-up table, a hardware implementation, a PLA, etc.). Thus, while the execution of the various instructions by the decoder and execution unit is represented by a series of if/then statements, it is understood that the execution of an instruction does not require a serial processing of these if/then statements. Rather, any mechanism for logically performing this if/then processing is considered to be within the scope of the invention.

FIG. 1 additionally shows a data storage device 107, such as a magnetic disk or optical disk, and its corresponding disk drive, can be coupled to computer system 100. Computer system 100 can also be coupled via bus 101 to a display device 121 for displaying information to a computer user. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom.

Another device which may be coupled to bus 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device may include a speaker which is coupled to a digital to analog (D/A) converter for playing back the digitized sounds.

Also, computer system 100 can be a terminal in a computer network (e.g., a LAN). Computer system 100 would then be a computer subsystem of a computer network. Computer system 100 optionally includes video digitizing device 126. Video digitizing device 126 can be used to capture video images that can be transmitted to others on the computer network.

In one embodiment, the processor 109 additionally supports an instruction set which is compatible with the x86 instruction set used by existing processors (such as the Pentium® processor) manufactured by Intel Corporation of Santa Clara, Calif. Thus, in one embodiment, processor 109 supports all the operations supported in the IA™—Intel Architecture, as defined by Intel Corporation of Santa Clara, Calif. (see *Microprocessors*, Intel Data Books volume 1 and volume 2, 1992 and 1993, available from Intel of Santa Clara, Calif.). As a result, processor 109 can support existing x86 operations in addition to the operations of the invention. While the invention is described as being incorporated into an x86 based instruction set, alternative embodiments could incorporate the invention into other instruction sets. For example, the invention could be incorporated into a 64-bit processor using a new instruction set.

Figure 2:
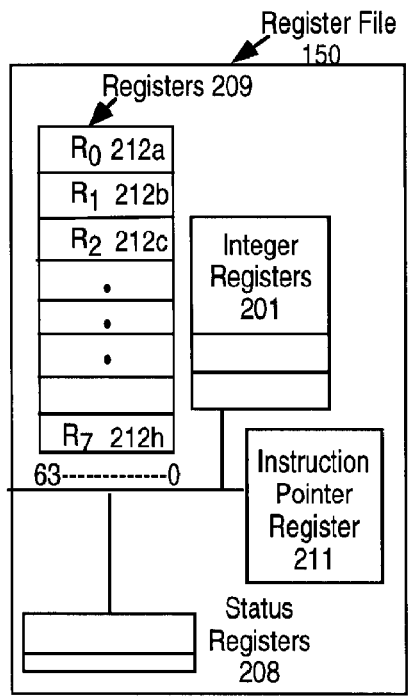
FIG. 2 illustrates a register file of the processor according to one embodiment of the invention.

FIG. 2 illustrates the register file of the processor according to one embodiment of the invention. The register file 150 is used for storing information, including control/status information, integer data, floating point data, and packed data. In the embodiment shown in FIG. 2, the register file 150 includes integer registers 201, registers 209, status registers 208, and instruction pointer register 211. Status registers 208 indicate the status of processor 109. Instruction pointer register 211 stores the address of the next instruction to be executed. Integer registers 201, registers 209, status registers 208, and instruction pointer register 211 are all coupled to internal bus 170. Any additional registers would also be coupled to internal bus 170.

In one embodiment, the registers 209 are used for both packed data and floating point data. In one such embodiment, the processor 109, at any given time, must treat the registers 209 as being either stack referenced floating point registers or non-stack referenced packed data registers. In this embodiment, a mechanism is included to allow the processor 109 to switch between operating on registers 209 as stack referenced floating point registers and non-stack referenced packed data registers. In another such embodiment, the processor 109 may simultaneously operate on registers 209 as non-stack referenced floating point and packed data registers. As another example, in another embodiment, these same registers may be used for storing integer data.

Of course, alternative embodiments may be implemented to contain more or less sets of registers. For example, an alternative embodiment may include a separate set of floating point registers for storing floating point data. As another example, an alternative embodiment may including a first set of registers, each for storing control/status information, and a second set of registers, each capable of storing integer, floating point, and packed data. As a matter of clarity, the registers of an embodiment should not be limited in meaning to a particular type of circuit. Rather, a register of an embodiment need only be capable of storing and providing data, and performing the functions described herein.

The various sets of registers (e.g., the integer registers 201, the registers 209) may be implemented to include different numbers of registers and/or to different size registers. For example, in one embodiment, the integer registers 201 are implemented to store thirty-two bits, while the registers 209 are implemented to store eighty bits (all eighty bits are used for storing floating point data, while only sixty-four are used for packed data). In addition, registers 209 contains eight registers, $R_0$ 212a through $R_7$ 212h. $R_1$ 212a, $R_2$ 212b and $R_3$ 212c are examples of individual registers in registers 209. Thirty-two bits of a register in registers 209 can be moved into an integer register in integer registers 201. Similarly, a value in an integer register can be moved into thirty-two bits of a register in registers 209. In another embodiment, the integer registers 201 each contain 64 bits, and 64 bits of data may be moved between the integer register 201 and the registers 209.

Figure 3:
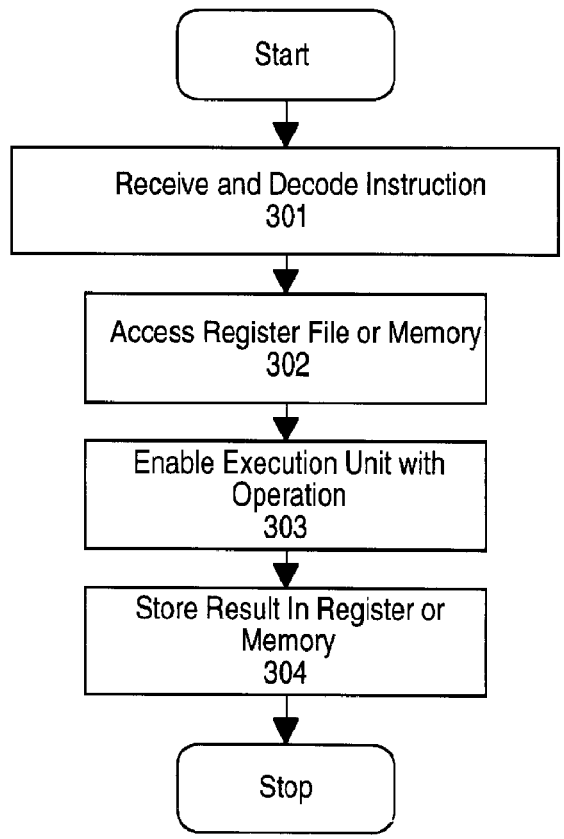
FIG. 3 is a flow diagram illustrating the general steps used by the processor to manipulate data according to one embodiment of the invention.

FIG. 3 is a flow diagram illustrating the general steps are used by the processor to manipulate data according to one embodiment of the invention. That is, FIG. 3 illustrates the steps followed by processor 109 while performing an operation on packed data, performing an operation on unpacked data, or performing some other operation. For example, such operations include a load operation to load a register in register file 150 with data from cache 160, main memory 104, read only memory (ROM) 106, or data storage device 107.

At step 301, the decoder 165 receives a control signal from either the cache 160 or bus 101. Decoder 165 decodes the control signal to determine the operations to be performed.

At step 302, Decoder 165 accesses the register file 150, or a location in memory. Registers in the register file 150, or memory locations in the memory, are accessed depending on the register address specified in the control signal. For example, for an operation on packed data, the control signal can include SRC1, SRC2 and DEST register addresses. SRC1 is the address of the first source register. SRC2 is the address of the second source register. In some cases, the SRC2 address is optional as not all operations require two source addresses. If the SRC2 address is not required for an operation, then only the SRC1 address is used. DEST is the address of the destination register where the result data is stored. In one embodiment, SRC1 or SRC2 is also used as DEST. SRC1, SRC2 and DEST are described more fully in relation to FIG. 6a and FIG. 6b. The data stored in the corresponding registers is referred to as Source1, Source2, and Result respectively. Each of these data is sixty-four bits in length.

In another embodiment of the invention, any one, or all, of SRC1, SRC2 and DEST, can define a memory location in the addressable memory space of processor 109. For example, SRC1 may identify a memory location in main memory 104, while SRC2 identifies a first register in integer registers 201 and DEST identifies a second register in registers 209. For simplicity of the description herein, the invention will be described in relation to accessing the register file 150. However, these accesses could be made to memory instead.

At step 303, execution unit 130 is enabled to perform the operation on the accessed data. At step 304, the result is stored back into register file 150 according to requirements of the control signal.

Data and Storage Formats

Figure 4:
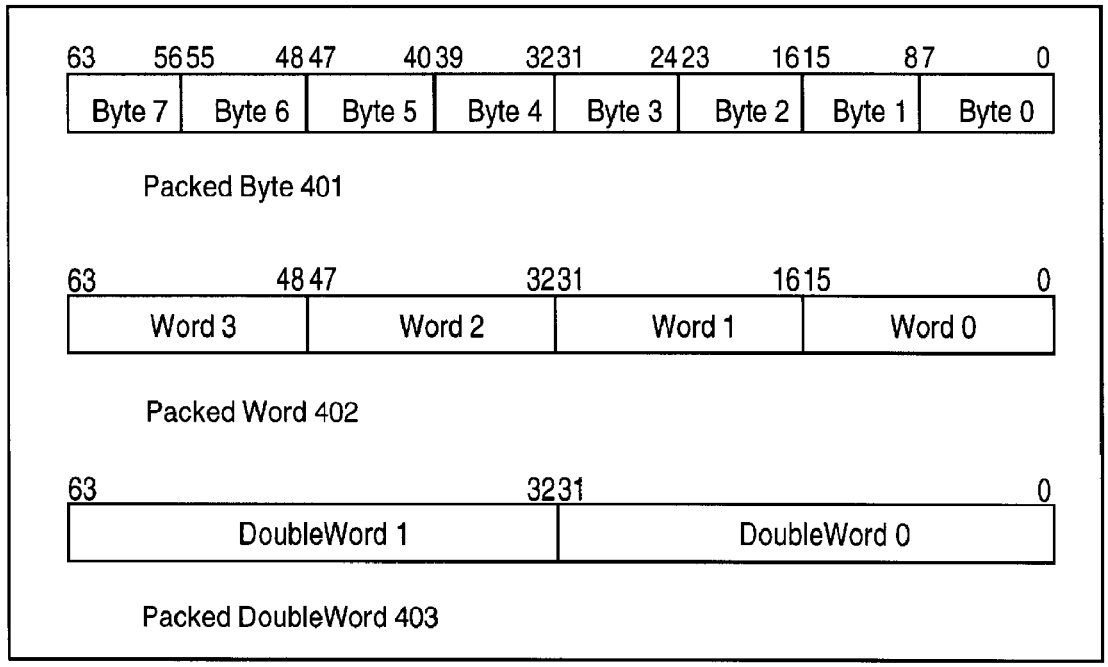
FIG. 4 illustrates packed data-types according to one embodiment of the invention.

FIG. 4 illustrates packed data-types according to one embodiment of the invention. Three packed data formats are illustrated; packed byte 401, packed word 402, and packed doubleword 403. Packed byte, in one embodiment of the invention, is sixty-four bits long containing eight data elements. Each data element is one byte long. Generally, a data element is an individual piece of data that is stored in a single register (or memory location) with other data elements of the same length. In one embodiment of the invention, the number of data elements stored in a register is sixty-four bits divided by the length in bits of a data element.

Packed word 402 is sixty-four bits long and contains four word 402 data elements. Each word 402 data element contains sixteen bits of information.

Packed doubleword 403 is sixty-four bits long and contains two doubleword 403 data elements. Each doubleword 403 data element contains thirty-two bits of information.

Figure 5A:
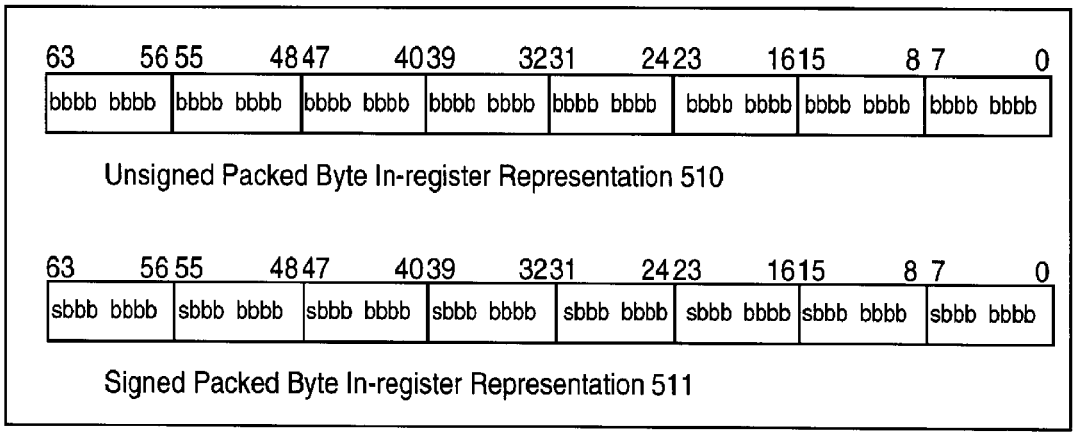
FIG. 5a illustrates in-register packed data representations according to one embodiment of the invention.
Figure 5B:
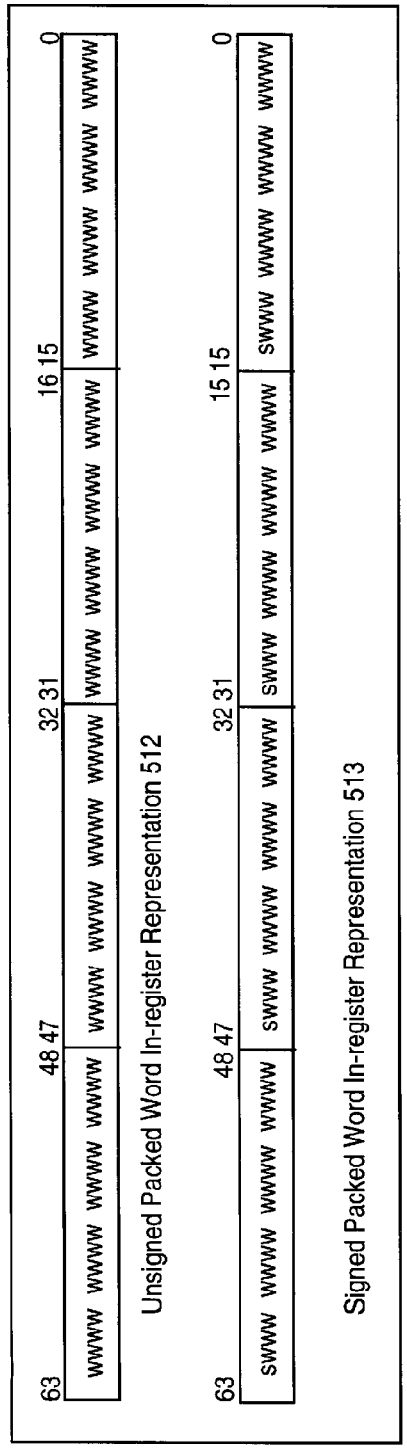
FIG. 5b illustrates in-register packed data representations according to one embodiment of the invention.
Figure 5C:
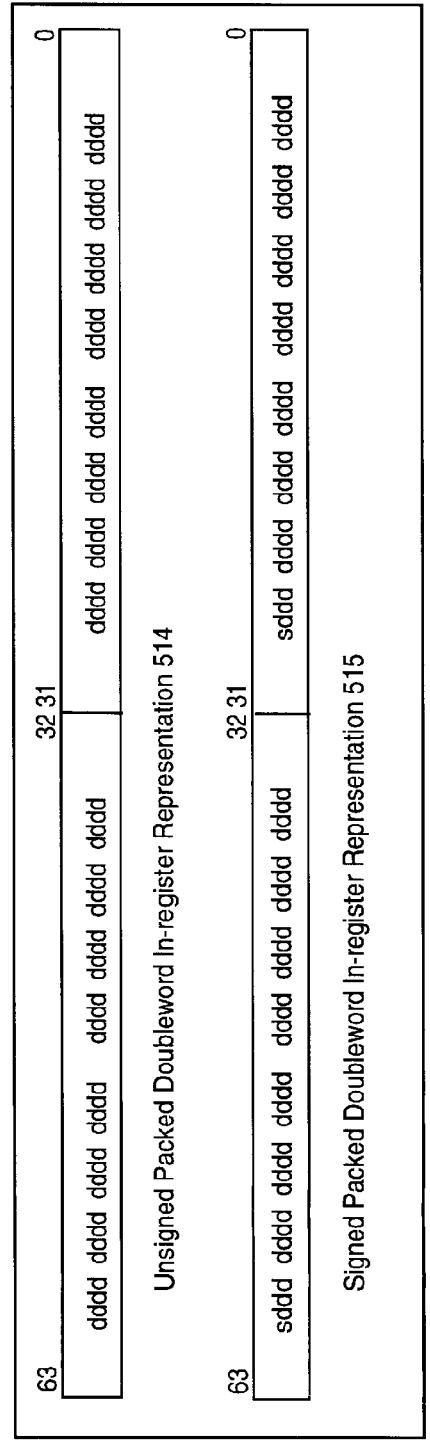
FIG. 5c illustrates in-register packed data representations according to one embodiment of the invention.

FIG. 5a through 5c illustrate the in-register packed data storage representation according to one embodiment of the invention. Unsigned packed byte in-register representation 510 illustrates the storage of an unsigned packed byte 401 in one of the registers $R_0$ 212a through $R_7$ 212h. Information for each byte data element is stored in bit seven through bit zero for byte zero, bit fifteen through bit eight for byte one, bit twenty-three through bit sixteen for byte two, bit thirty-one through bit twenty-four for byte three, bit thirty-nine through bit thirty-two for byte four, bit forty-seven through bit forty for byte five, bit fifty-five through bit forty-eight for byte six and bit sixty-three through bit fifty-six for byte seven. Thus, all available bits are used in the register. This storage arrangement increases the storage efficiency of the processor. As well, with eight data elements accessed, one operation can now be performed on eight data elements simultaneously. Signed packed byte in-register representation 511 illustrates the storage of a signed packed byte 401. Note that the eighth bit of every byte data element is the sign indicator.

Unsigned packed word in-register representation 512 illustrates how word three through word zero are stored in one register of registers 209. Bit fifteen through bit zero contain the data element information for word zero, bit thirty-one through bit sixteen contain the information for data element word one, bit forty-seven through bit thirty-two contain the information for data element word two and bit sixty-three through bit forty-eight contain the information for data element word three. Signed packed word in-register representation 513 is similar to the unsigned packed word in-register representation 512. Note that the sixteenth bit of each word data element is the sign indicator.

Unsigned packed doubleword in-register representation 514 shows how registers 209 store two doubleword data elements. Doubleword zero is stored in bit thirty-one through bit zero of the register. Doubleword one is stored in bit sixty-three through bit thirty-two of the register. Signed packed doubleword in-register representation 515 is similar to unsigned packed doubleword in-register representation 514. Note that the necessary sign bit is the thirty-second bit of the doubleword data element.

As mentioned previously, registers 209 may be used for both packed data and floating point data. In this embodiment of the invention, the individual programming processor 109 may be required to track whether an addressed register, $R_0$ 212a for example, is storing packed data or floating point data. In an alternative embodiment, processor 109 could track the type of data stored in individual registers of registers 209. This alternative embodiment could then generate errors if, for example, a packed addition operation were attempted on floating point data.

Control Signal Formats

The following describes one embodiment of the control signal formats used by processor 109 to manipulate packed data. In one embodiment of the invention, control signals are represented as thirty-two bits. Decoder 165 may receive the control signal from bus 101. In another embodiment, decoder 165 can also receive such control signals from cache 160.

Figure 6A:
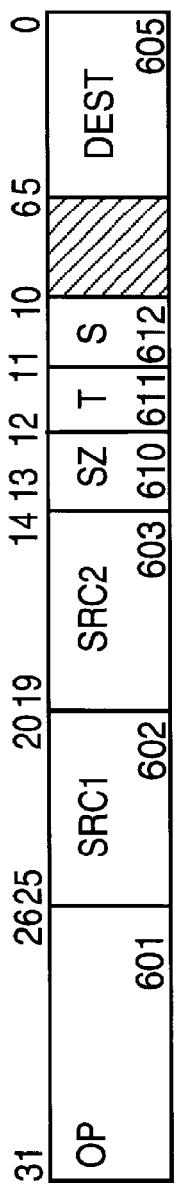
FIG. 6a illustrates a control signal format for indicating the use of packed data according to one embodiment of the invention.

FIG. 6a illustrates a control signal format for indicating the use of packed data according to one embodiment of the invention. Operation field OP 601, bit thirty-one through bit twenty-six, provides information about the operation to be performed by processor 109; for example, packed addition, packed subtraction, etc. SRC1 602, bit twenty-five through twenty, provides the source register address of a register in registers 209. This source register contains the first packed data, Source1, to be used in the execution of the control signal. Similarly, SRC2 603, bit nineteen through bit fourteen, contains the address of a register in registers 209. This second source register contains the packed data, Source2, to be used during execution of the operation. DEST 605, bit five through bit zero, contains the address of a register in registers 209. This destination register will store the result packed data, Result, of the packed data operation.

Control bits SZ 610, bit twelve and bit thirteen, indicates the length of the data elements in the first and second packed data source registers. If SZ 610 equals $01_2$, then the packed data is formatted as packed byte 401. If SZ 610 equals $10_2$, then the packed data is formatted as packed word 402. SZ 610 equaling $00_2$ or $11_2$ is reserved, however, in another embodiment, one of these values could be used to indicate packed doubleword 403.

Control bit T 611, bit eleven, indicates whether the operation is to be carried out with saturate mode. If T 611 equals one, then a saturating operation is performed. If T 611 equals zero, then a non-saturating operation is performed. Saturating operations will be described later.

Control bit S 612, bit ten, indicates the use of a signed operation. If S 612 equals one, then a signed operation is performed. If S 612 equals zero, then an unsigned operation is performed.

Figure 6B:
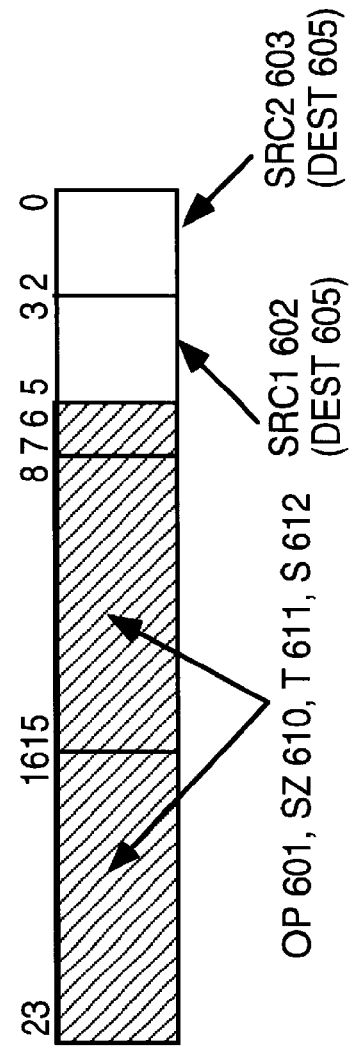
FIG. 6b illustrates a second control signal format for indicating the use of packed data according to one embodiment of the invention.

FIG. 6b illustrates a second control signal format for indicating the use of packed data according to one embodiment of the invention. This format corresponds with the general integer opcode format described in the "Pentium Processor Family User's Manual," available from Intel Corporation, Literature Sales, P.O. Box 7641, Mt. prospect, IL, 60056-7641. Note that OP 601, SZ 610, T 611, and S 612 are all combined into one large field. For some control signals, bits three through five are SRC1 602. In one embodiment, where there is a SRC1 602 address, then bits three through five also correspond to DEST 605. In an alternate embodiment, where there is a SRC2 603 address, then bits zero through two also correspond to DEST 605. For other control signals, like a packed shift immediate operation, bits three through five represent an extension to the opcode field. In one embodiment, this extension allows a programmer to include an immediate value with the control signal, such as a shift count value. In one embodiment, the immediate value follows the control signal. This is described in more detail in the "Pentium Processor Family User's Manual," in appendix F, pages F-1 through F-3. Bits zero through two represent SRC2 603. This general format allows register to register, memory to register, register by memory, register by register, register by immediate, register to memory addressing. Also, in one embodiment, this general format can support integer register to register, and register to integer register addressing.

Description of Saturate/Unsaturate

As mentioned previously, T 611 indicates whether operations optionally saturate. Where the result of an operation, with saturate enabled, overflows or underflows the range of the data, the result will be clamped. Clamping means setting the result to a maximum or minimum value should a result exceed the range's maximum or minimum value. In the case of underflow, saturation clamps the result to the lowest value in the range and in the case of overflow, to the highest value. The allowable range for each data format is shown in Table 5.

TABLE 5

| Data Format | Minimum Value | Maximum Value |
| --- | --- | --- |
| Unsigned Byte | 0 | 255 |
| Signed Byte | −128 | 127 |
| Unsigned Word | 0 | 65535 |
| Signed Word | −32768 | 32767 |
| Unsigned Doubleword | 0 | $2^{32} - 1$ |
| Signed Doubleword | $-2^{31}$ | $2^{31} - 1$ |

As mentioned above, T 611 indicates whether saturating operations are being performed. Therefore, using the unsigned byte data format, if an operation's result 258 and saturation was enabled, then the result would be clamped to 255 before being stored into the operation's destination register. Similarly, if an operation's result=−32999 and processor 109 used signed word data format with saturation enabled, then the result would be clamped to −32768 before being stored into the operation's destination register.

Multiply-Add/Subtract Operation(s)

In one embodiment of the invention, the SRC1 register contains packed data (Source1), the SRC2 register contains packed data (Source2), and the DEST register will contain the result (Result) of performing the multiply-add or multiply-subtract instruction on Source1 and Source2. In the first step of the multiply-add and multiply-subtract instruction, Source1 will have each data element independently multiplied by the respective data element of Source2 to generate a set of respective intermediate results. These intermediate results are summed by pairs to generate the Result for the multiply-add instruction. In contrast, these intermediate results are subtracted by pairs to generate the Result for the multiply-subtract instruction.

In one embodiment of the invention, the multiply-add and multiply-subtract instructions operate on signed packed data and truncate the results to avoid any overflows. In addition, these instructions operate on packed word data and the Result is a packed double word. However, alternative embodiments could support these instructions for other packed data types.

Figure 7:
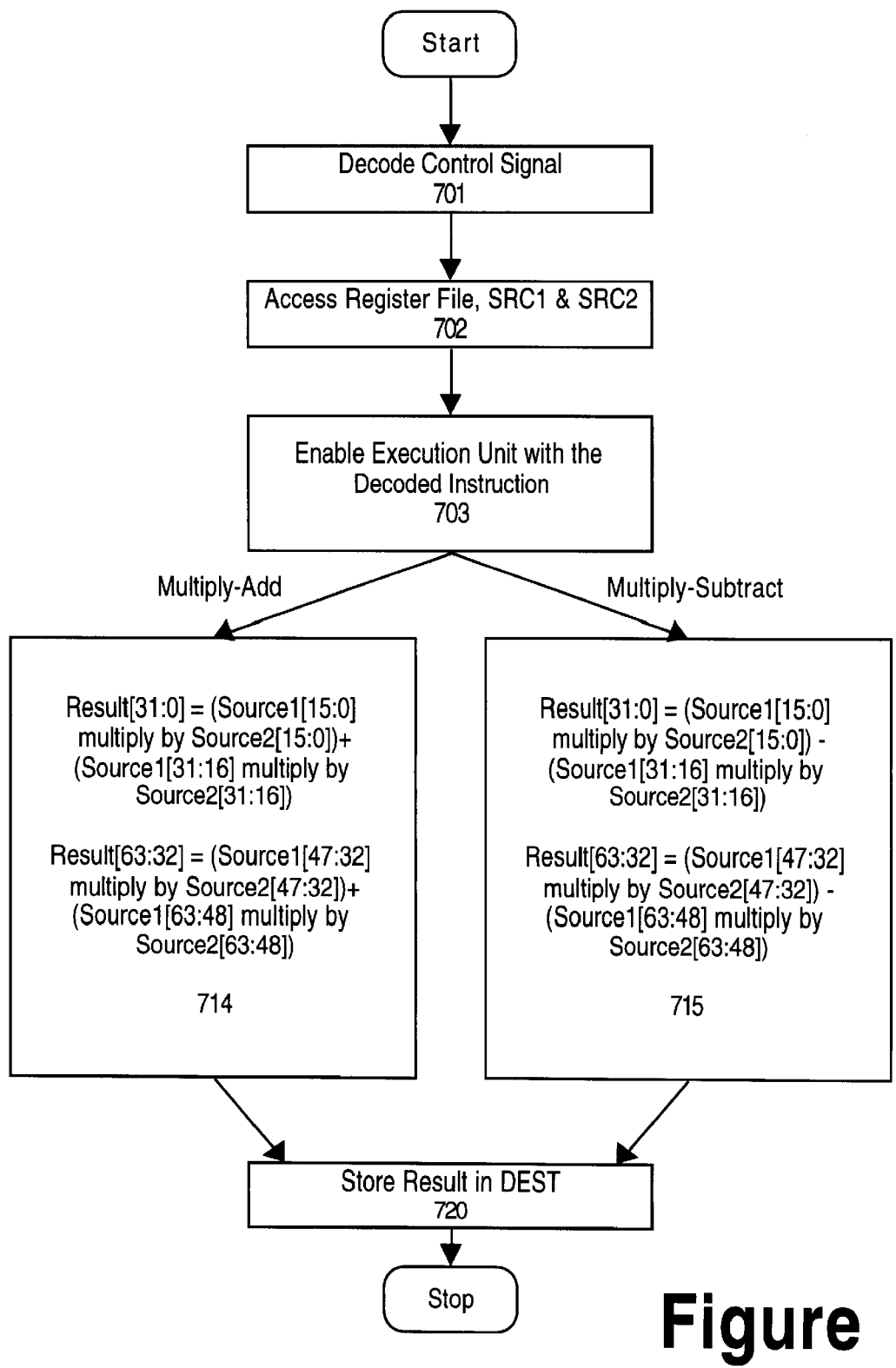
FIG. 7 is a flow diagram illustrating a method for performing multiply-add and multiply-subtract operations on packed data according to one embodiment of the invention.

FIG. 7 is a flow diagram illustrating a method for performing multiply-add and multiply-subtract operations on packed data according to one embodiment of the invention.

At step 701, decoder 165 decodes the control signal received by processor 109. Thus, decoder 165 decodes: the operation code for a multiply-add instruction or a multiply-subtract instruction.

At step 702, via internal bus 170, decoder 165 accesses registers 209 in register file 150 given the SRC1 602 and SRC2 603 addresses. Registers 209 provide execution unit 130 with the packed data stored in the SRC1 602 register (Source1), and the packed data stored in SRC2 603 register (Source2). That is, registers 209 communicate the packed data to execution unit 130 via internal bus 170.

At step 703, decoder 165 enables execution unit 130 to perform the instruction. If the instruction is a multiply-add instruction, flow passes to step 714. However, if the instruction is a multiply-subtract instruction, flow passes to step 715.

In step 714, the following is performed. Source1 bits fifteen through zero are multiplied by Source2 bits fifteen through zero generating a first 32-bit intermediate result (Intermediate Result 1). Source1 bits thirty-one through sixteen are multiplied by Source2 bits thirty-one through sixteen generating a second 32-bit intermediate result (Intermediate Result 2). Source1 bits forty-seven through thirty-two are multiplied by Source2 bits forty-seven through thirty-two generating a third 32-bit intermediate result (Intermediate Result 3). Source1 bits sixty-three through forty-eight are multiplied by Source2 bits sixty-three through forty-eight generating a fourth 32-bit intermediate result (Intermediate Result 4). Intermediate Result 1 is added to Intermediate Result 2 generating Result bits thirty-one through 0, and Intermediate Result 3 is added to Intermediate Result 4 generating Result bits sixty-three through thirty-two.

Step 715 is the same as step 714, with the exception that Intermediate Result 1 Intermediate Result 2 are subtracted to generate bits thirty-one through 0 of the Result, and Intermediate Result 3 and Intermediate Result 4 are subtracted to generate bits sixty-three through thirty-two of the Result.

Different embodiments may perform the multiplies and adds/subtracts serially, in parallel, or in some combination of serial and parallel operations.

At step 720, the Result is stored in the DEST register.

Packed Data Multiply-Add/Subtract Circuits

In one embodiment, the multiply-add and multiply-subtract instructions can execute on multiple data elements in the same number of clock cycles as a single multiply on unpacked data. To achieve execution in the same number of clock cycles, parallelism is used. That is, registers are simultaneously instructed to perform the multiply-add/subtract operations on the data elements. This is discussed in more detail below.

Figure 8:
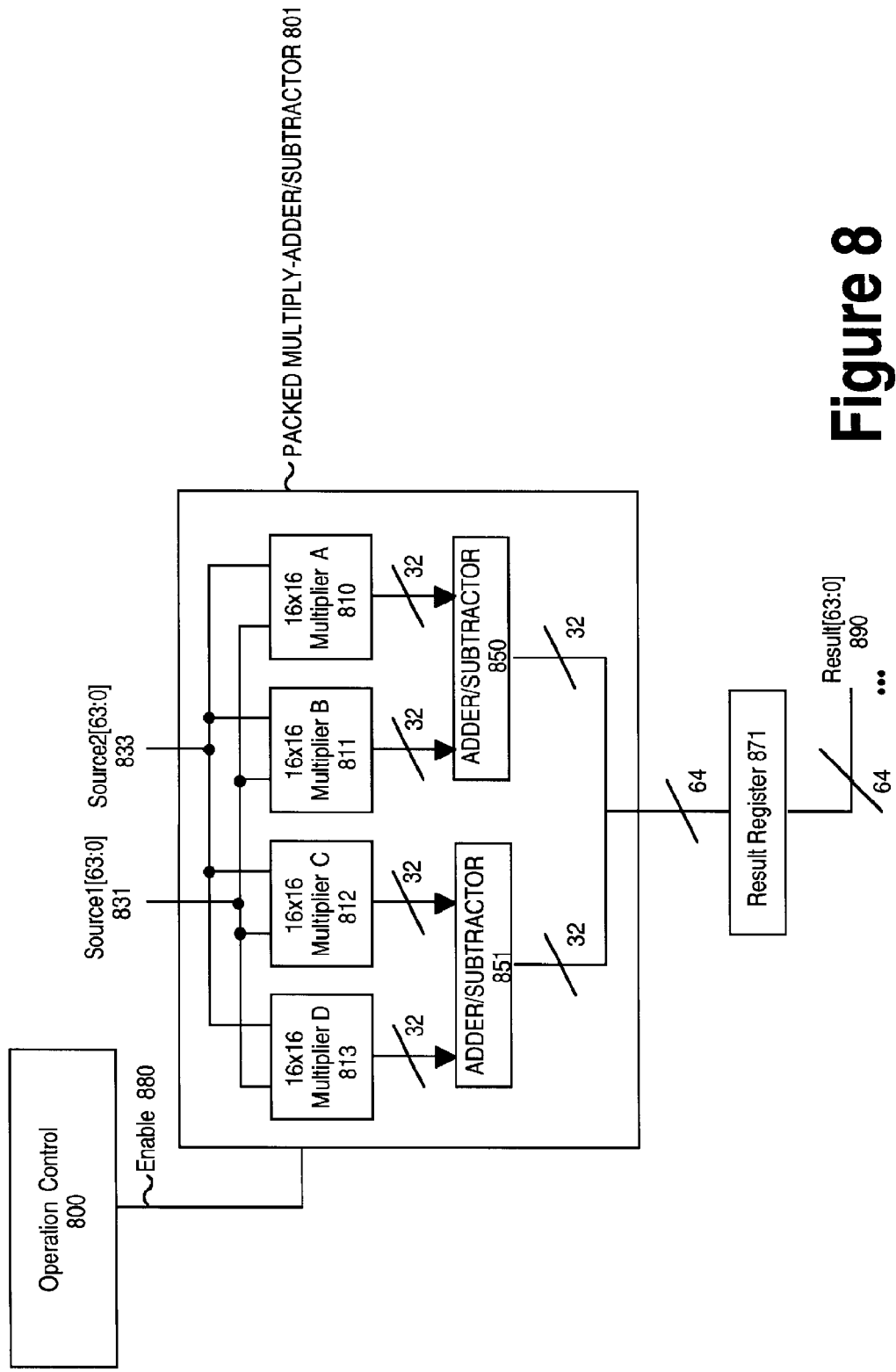
FIG. 8 illustrates a circuit for performing multiply-add and/or multiply-subtract operations on packed data according to one embodiment of the invention.

FIG. 8 illustrates a circuit for performing multiply-add and/or multiply-subtract operations on packed data according to one embodiment of the invention. Operation control 800 processes the control signal for the multiply-add and multiply-subtract instructions. Operation control 800 outputs signals on Enable 880 to control Packed multiply-adder/subtractor 801.

Packed multiply-adder/subtractor 801 has the following inputs: Source1[63:0] 831, Source2[63:0] 833, and Enable 880. Packed multiply-adder/subtractor 801 includes four 16×16 multiplier circuits: 16×16 multiplier A 810, 16×16 multiplier B 811, 16×16 multiplier C 812 and 16×16 multiplier D 813. 16×16 multiplier A 810 has as inputs Source1 [15:0] and Source2[15:0]. 16×16 multiplier B 811 has as inputs Source1[31:16] and Source2[31:16]. 16×16 multiplier C 812 has as inputs Source1[47:32] and Source2[47:32]. 16×16 multiplier D 813 has as inputs Source1[63:48] and Source2[63:48]. The 32-bit intermediate results generated by 16×16 multiplier A 810 and 16×16 multiplier B 811 are received by adder/subtractor 1350, while the 32-bit intermediate results generated by 16×16 multiplier C 812 and 16×16 multiplier D 813 are received by adder/subtractor 851.

Based on whether the current instruction is a multiply/add or multiply/subtract instruction, adder/subtractor 850 and adder/subtractor 851 add or subtract their respective 32-bit inputs. The output of adder/subtractor 850 (i.e., Result bits 31 through zero of the Result) and the output of adder/subtractor 851 (i.e., bits 63 through 32 of the Result) are combined into the 64-bit Result and communicated to Result Register 871.

In one embodiment, each of adder/subtractor 851 and adder/subtractor 850 are composed of four 8-bit adders/subtractors with the appropriate propagation delays. However, alternative embodiments could implement adder/subtractor 851 and adder/subtractor 850 in any number of ways (e.g., two 32-bit adders/subtractors).

To perform the equivalent of these multiply-add or multiply-subtract instructions in prior art processors which operate on unpacked data, four separate 64-bit multiply operations and two 64-bit add or subtract operations, as well as the necessary load and store operations, would be needed. This wastes data lines and circuitry that are used for the bits that are higher than bit sixteen for Source1 and Source 2, and higher than bit thirty two for the Result. As well, the entire 64-bit result generated by the prior art processor may not be of use to the programmer. Therefore, the programmer would have to truncate each result.

Performing the equivalent of this multiply-add instruction using the prior art DSP processor described with reference to Table 1 requires one instruction to zero the accumulation value and four multiply accumulate instructions. Performing the equivalent of this multiply-add instruction using the prior art DSP processor described with reference to Table 2 requires one instruction to zero the accumulation value and 2-accumulate instructions.

Advantages of Including the Described Multiply-Add Instruction in the Instruction Set As previously described, the prior art multiply accumulate instructions always add the results of their multiplications to an accumulation value. This accumulation value becomes a bottleneck for performing operations other than multiplying and accumulating (e.g., the accumulation value must be cleared each time a new set of operations is required which do not require the previous accumulation value). This accumulation value also becomes a bottleneck if operations, such as rounding, need to be performed before accumulation.

In contrast, the disclosed multiply-add and multiply-subtract instructions do not carry forward an accumulation value. As a result, these instructions are easier to use in a wider variety of algorithms. In addition, software pipelining can be used to achieve comparable throughput. To illustrate the versatility of the multiply-add instruction, several example multimedia algorithms are described below. Some of these multimedia algorithms use additional packed data instructions. The operation of these additional packed data instructions are shown in relation to the described algorithms. For a further description of these packed data instructions, see "A Set of Instructions for Operating on Packed Data," filed on Aug. 31, 1995, Ser. No. 08/521,360. Of course, other packed data instructions could be used. In addition, a number of steps requiring the use of general purpose processor instructions to manage data movement, looping, and conditional branching have been omitted in the following examples.

1) Multiplication of Complex Numbers

The disclosed multiply-add instruction can be used to multiply two complex numbers in a single instruction as shown in Table 6a. As previously described, the multiplication of two complex number (e.g., $r_1$ $i_1$ and $r_2$ $i_2$) is performed according to the following equation:

Real Component=$r_1 \cdot r_2 - i_1 \cdot i_2$

Imaginary Component=$r_1 \cdot i_2 + r_2 \cdot i_1$

If this instruction is implemented to be completed every clock cycle, the invention can multiply two complex numbers every clock cycle.

TABLE 6A

| Multiply-Add Source1, Source2 | | | | |
|---|---|---|---|---|
| $r_1$ | $i_2$ | $r_1$ | $i_1$ | Source1 |
| $r_2$ | $-i_2$ | $i_2$ | $r_2$ | Source2 |
| = | | | | |
| Real Component: $r_1 r_2 - i_1 i_2$ | | Imaginary Component: $r_1 i_2 + r_2 i_1$ | | Result1 |

As another example, Table 6b shows the instructions used to multiply together three complex numbers.

TABLE 6b

| Multiply-Add Source1, Source2 | | | | |
|---|---|---|---|---|
| $r_1$ | $i_1$ | $r_1$ | $i_1$ | Source1 |
| $r_2$ | $-i_2$ | $i_2$ | $r_2$ | Source2 |
| = | | | | |
| Real Component$_1$: $r_1 r_2 - i_1 i_2$ | | Imaginary Component$_1$: $r_1 i_2 + r_2 i_1$ | | Result1 |
| Packed Shift Right Source1, Source2 | | | | |
| Real Component$_1$ | | Imaginary Component$_1$ | | Result1 |
| 16 | | | | |
| = | | | | |
| Real Component$_1$ | | Imaginary Component$_1$ | | Result2 |
| Pack Result2, Result2 | | | | |
| Real Component$_1$ | | Imaginary Component$_1$ | | Result2 |
| Real Component$_1$ | | Imaginary Component$_1$ | | Result2 |
| = | | | | |
| Real Component$_1$ | Imaginary Component$_1$ | Real Component$_1$ | Imaginary Component$_1$ | Result3 |
| Multiply-Add Result3, Source3 | | | | |
| Real Component$_1$: $r_1 r_2 - i_1 i_2$ | Imaginary Component$_1$: $r_1 i_2 + r_2 i_1$ | Real Component$_1$: $r_1 r_2 - i_1 i_2$ | Imaginary Component$_1$: $r_1 i_2 + r_2 i_1$ | Result3 |
| $r_3$ | $-i_3$ | $i_3$ | $r_3$ | Source3 |
| = | | | | |
| Real Component$_2$ | | Imaginary Component$_2$ | | Result4 |

2) Multiply Accumulation Operations

The disclosed multiply-add instructions can also be used to multiply and accumulate values. For example, two sets of four data elements ($A_{1-4}$ and $B_{1-4}$) may be multiplied and accumulated as shown below in Table 7. In one embodiment, each of the instructions shown in Table 7 is implemented to complete each clock cycle.

TABLE 7

| Multiply-Add Source1, Source2 | | | | |
|---|---|---|---|---|
| 0 | 0 | $A_1$ | $A_2$ | Source1 |
| 0 | 0 | $B_1$ | $B_2$ | Source2 |
| = | | | | |
| 0 | | $A_1 B_1 + A_2 B_2$ | | Result1 |
| Multiply-Add Source3, Source4 | | | | |
| 0 | 0 | $A_3$ | $A_4$ | Source3 |
| 0 | 0 | $B_3$ | $B_4$ | Source4 |
| = | | | | |
| 0 | | $A_3 A_4 + B_3 B_4$ | | Result2 |
| Unpacked Add Result1, Result2 | | | | |
| 0 | | $A_1 B_1 + A_2 B_2$ | | Result1 |
| 0 | | $A_3 A_4 + B_3 B_4$ | | Result2 |
| = | | | | |
| 0 | | $A_1 B_1 + A_2 B_2 + A_3 A_4 + B_3 B_4$ | | Result3 |

If the number of data elements in each set exceeds 8 and is a multiple of 4, the multiplication and accumulation of these sets requires fewer instructions if performed as shown in table 8 below.

TABLE 8

| Multiply-Add Source1, Source2 | | | | |
|---|---|---|---|---|
| $A_1$ | $A_2$ | $A_3$ | $A_4$ | Source1 |
| $B_1$ | $B_2$ | $B_3$ | $B_4$ | Source2 |
| = | | | | |
| $A_1 B_1 + A_2 B_2$ | | $A_3 B_3 + A_4 B_4$ | | Result1 |
| Multiply-Add Source3, Source4 | | | | |
| $A_5$ | $A_6$ | $A_7$ | $A_8$ | Source3 |
| $B_5$ | $B_6$ | $B_7$ | $B_8$ | Source4 |
| = | | | | |
| $A_5 B_5 + A_6 B_6$ | | $A_7 B_7 + A_8 B_8$ | | Result2 |
| Packed Add Result1, Result2 | | | | |
| $A_1 B_1 + A_2 B_2$ | | $A_3 B_3 + A_4 B_4$ | | Result1 |
| $A_5 B_5 + A_6 B_6$ | | $A_7 B_7 + A_8 B_8$ | | Result2 |
| = | | | | |
| $A_1 B_1 + A_2 B_2 + A_5 B_5 + A_6 B_6$ | | $A_3 B_3 + A_4 B_4 + A_7 B_7 + A_8 B_8$ | | Result3 |
| Unpack High Result3, Source5 | | | | |
| $A_1 B_1 + A_2 B_2 + A_5 B_5 + A_6 B_6$ | | $A_3 B_3 + A_4 B_4 + A_7 B_7 + A_8 B_8$ | | Result3 |
| 0 | | 0 | | Source5 |
| = | | | | |
| 0 | | $A_1 B_1 + A_2 B_2 + A_5 B_5 + A_6 B_6$ | | Result4 |
| Unpack Low Result3, Source5 | | | | |
| $A_1 B_1 + A_2 B_2 + A_5 B_5 + A_6 B_6$ | | $A_3 B_3 + A_4 B_4 + A_7 B_7 + A_8 B_8$ | | Result3 |
| 0 | | 0 | | Source5 |
| = | | | | |
| 0 | | $A_3 B_3 + A_4 B_4 + A_7 B_7 + A_8 B_8$ | | Result5 |
| Packed Add Result4, Result5 | | | | |
| 0 | | $A_1 B_1 + A_2 B_2 + A_5 B_5 + A_6 B_6$ | | Result4 |
| 0 | | $A_3 B_3 + A_4 B_4 + A_7 B_7 + A_8 B_8$ | | Result5 |
| = | | | | |
| 0 | | TOTAL | | Result6 |

As another example, Table 9 shows the separate multiplication and accumulation of sets A and B and sets C and D, where each of these sets includes 2 data elements.

TABLE 9

| Multiply-Add Source1, Source2 | | | | |
|---|---|---|---|---|
| $A_1$ | $A_2$ | $C_1$ | $C_2$ | Source1 |
| $B_1$ | $B_2$ | $D_1$ | $D_2$ | Source2 |
| = | | | | |
| $A_1 B_1 + A_2 B_2$ | | $C_1 D_1 + C_2 D_2$ | | Result1 |

As another example, Table 10 shows the separate multiplication and accumulation of sets A and B and sets C and D, where each of these sets includes 4 data elements.

TABLE 10

| Multiply-Add Source1, Source2 | | | | |
|---|---|---|---|---|
| $A_1$ | $A_2$ | $C_1$ | $C_2$ | Source1 |
| $B_1$ | $B_2$ | $D_1$ | $D_2$ | Source2 |
| = | | | | |
| $A_1 B_1 + A_2 B_2$ | | $C_1 D_1 + C_2 D_2$ | | Result1 |
| Multiply-Add Source3, Source4 | | | | |
| $A_3$ | $A_4$ | $C_3$ | $C_4$ | Source3 |
| $B_3$ | $B_4$ | $D_3$ | $D_4$ | Source4 |
| = | | | | |
| $A_3 B_3 + A_4 B_4$ | | $C_3 D_3 + C_4 D_4$ | | Result2 |

TABLE 10-continued

| Packed Add Result1, Result2 | | |
|---|---|---|
| $A_1B_1 + A_2B_2$<br>$A_3B_3 + A_4B_4$ | $C_1D_1 + C_2D_2$<br>$C_3D_3 + C_4D_4$ | Result1<br>Result2 |
| = | | |
| $A_1B_1 + A_2B_2 + A_3B_3 + A_4B_4$ | $C_1D_1 + C_2D_2 + C_3D_3 + C_4D_4$ | Result6 |

3) Dot Product Algorithms

Dot product (also termed as inner product) is used in signal processing and matrix operations. For example, dot product is used when computing the product of matrices, digital filtering operations (such as FIR and IIR filtering), and computing correlation sequences. Since many speech compression algorithms (e.g., GSM, G.728, CELP, and VSELP) and Hi-Fi compression algorithms (e.g., MPEG and subband coding) make extensive use of digital filtering and correlation computations, increasing the performance of dot product increases the performance of these algorithms.

The dot product of two length N sequences A and B is defined as:

$$Result = \sum_{i=0}^{N-1} Ai \cdot Bi$$

Performing a dot product calculation makes extensive use of the multiply accumulate operation where corresponding elements of each of the sequences are multiplied together, and the results are accumulated to form the dot product result.

The dot product calculation can be performed using the multiply-add instruction. For example if the packed data type containing four sixteen-bit elements is used, the dot product calculation may be performed on two sequences each containing four values by:

1) accessing the four sixteen-bit values from the A sequence to generate Source1 using a move instruction;
2) accessing four sixteen-bit values from the B sequence to generate Source2 using a move instruction; and
3) performing multiplying and accumulating as previously described using a multiply-add, packed add, and shift instructions.

For vectors with more than just a few elements the method shown in Table 10 is used and the final results are added together at the end. Other supporting instructions include the packed OR and XOR instructions for initializing the accumulator register, the packed shift instruction for shifting off unwanted values at the final stage of computation. Loop control operations are accomplished using instructions already existing in the instruction set of processor 109.

4) Discrete Cosign Transform Algorithms

Discrete Cosine Transform (DCT) is a well known function used in many signal processing algorithms. Video and image compression algorithms, in particular, make extensive use of this transform.

In image and video compression algorithms, DCT is used to transform a block of pixels from the spatial representation to the frequency representation. In the frequency representation, the picture information is divided into frequency components, some of which are more important than others. The compression algorithm selectively quantizes or discards the frequency components that do not adversely affect the reconstructed picture contents. In this manner, compression is achieved.

There are many implementations of the DCT, the most popular being some kind of fast transform method modeled based on the Fast Fourier Transform (FFT) computation flow. In the fast transform, an order N transform is broken down to a combination of order N/2 transforms and the result recombined. This decomposition can be carried out until the smallest order 2 transform is reached. This elementary 2 transform kernel is often referred to as the butterfly operation. The butterfly operation is expressed as follows:

$X=a*x+b*y$ $Y=c*x-d*y$ where a, b, c and d are termed the coefficients, x and y are the input data, and X and Y are the transform output.

The multiply-add allows the DCT calculation to be performed using packed data in the following manner:

1) accessing the two 16-bit values representing x and y to generate Source1 (see Table 11 below) using the move and unpack instructions;
2) generating Source2 as shown in Table 11 below—Note that Source2 may be reused over a number of butterfly operations; and
3) performing a multiply-add instruction using Source1 and Source2 to generate the Result (see Table 11 below).

TABLE 11

| x | y | x | y | Source1 |
|---|---|---|---|---|
| a | b | c | −d | Source2 |
| a · x + b · y | | c · x − d · y | | Source3 |

In some situations, the coefficients of the butterfly operation are 1. For these cases, the butterfly operation degenerates into just adds and subtracts that may be performed using the packed add and packed subtract instructions.

An IEEE document specifies the accuracy with which inverse DCT should be performed for video conferencing. (See, IEEE Circuits and Systems Society, "IEEE Standard Specifications for the Implementations of 8×8 Inverse Discrete Cosine Transform," IEEE Std. 1180-1990, IEEE Inc. 345 East 47th St., NY, N.Y. 10017, USA, Mar. 18, 1991). The required accuracy is met by the disclosed multiply-add instruction because it uses 16-bit inputs to generate 32-bit outputs.

In this manner, the described multiply-add instruction can be used to improve the performance of a number of different algorithms, including algorithms that require the multiplication of complex numbers, algorithms that require transforms, and algorithms that require multiply accumulate operations. As a result, this multiply-add instruction can be used in a general purpose processor to improve the performance of a greater number algorithms than the described prior art instructions.

Alternative Embodiments

While the described embodiment uses 16-bit data elements to generate 32-bit data elements, alternative embodiments could use different sized inputs to generate different sized outputs. In addition, while in the described embodiment Source1 and Source 2 each contain 4 data elements and the multiply-add instruction performs two multiply-add operations, alternative embodiment could operate on packed data having more or less data elements. For example, one alternative embodiment operates on packed data having 8 data elements using 4 multiply-adds generating a resulting packed data having 4 data elements. While in the described embodiment each multiply-add operation operates on 4 data elements by performing 2 multiplies and 1 addition, alternative embodiments could be implemented to operate on more or less data elements using more or less multiplies and additions. As an example, one alternative embodiment operates on 8 data elements using 4 multiplies (one for each pair of data elements) and 3 additions (2 additions to add the results of the 4 multiplies and 1 addition to add the results of the 2 previous additions).

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A microprocessor comprising:
a decoder to receive a multiply-add instruction;
a register file to initially store, in a first register, a first packed data having a first plurality of packed data elements including at least four initial data elements;
said register file also to store, in a second register, a second packed data having a second plurality of packed data elements including at least four initial data elements, wherein each initial data element in said first plurality of data elements corresponds to an initial data element in said second plurality of data elements, in a respective position;
a circuit coupled to said register file and said decoder, said circuit in response to the multiply-add instruction to,
multiply together only said corresponding initial data elements in said first and second packed data to generate corresponding intermediate data elements, said intermediate data elements being paired into a plurality of sets,
arithmetically combine the intermediate data elements in each of said plurality of sets to generate a plurality of result data elements respectively representing the addition of paired intermediate data elements, wherein each of said plurality of result data elements provides a higher precision than said initial data elements, and store as a result of executing the multiply-add instruction said plurality of result data elements in the first register of said register file as a third packed data, wherein each element in the third packed data is the result of a multiply-add operation on two pairs of corresponding initial data elements.

2. The microprocessor of claim 1, wherein the first register and the second register can he used to store packed data and can also be used as floating point registers to store floating point data.

3. The microprocessor of claim 2, wherein the first register and the second register are registers of a register file that contains eight registers.

4. The microprocessor of claim 3, wherein the circuit comprises a portion of an execution unit having a multiplier and an adder that can he enabled to perform a multiply-add operation on data accessed from said register file.

5. The microprocessor of claim 2 wherein bits fifteen through zero in both of said first and second packed data are multiplied together to generate a first intermediate data element, bits thirty-one through sixteen in both of said first and second packed data are multiplied together to generate a second intermediate data element, bits forty-seven through thirty-two in both of said first and second packed data are multiplied together to generate a third intermediate data element, bits sixty-three through forty-eight in both of said first and second packed data are multiplied together to generate a fourth intermediate data element, said first and second intermediate data elements are added generating a first result data element in bits thirty-one through zero of the third packed data, and said third and fourth intermediate data elements are added generating a second result data element in bits sixty-three through thirty-two of the third packed data.

6. A microprocessor comprising:
a decoder to receive a multiply-add instruction having an opcode format comprising three bytes, a third byte of the three bytes permitting a source register address and a source-destination register address each one of the source register address and the source-destination register address consisting of three bits;
a register file to initially store, in a first register corresponding to the source-destination register address, a first 64-bit packed data having a first plurality of packed data elements including an A1, an A2, an A3, and an A4 initial data element;
said register file also to store, in a second register corresponding to the source register address, a second 64-bit packed data having a second plurality of packed data elements including a B1, a B2, a B3, and a B4 initial data element, wherein each initial data element in said first plurality of data elements corresponds to an initial data element in said second plurality of data elements, in a respective position;
a circuit coupled to said register file and said decoder, said circuit in response to the multiply-add instruction to,
multiply together only said corresponding initial data elements in said first and second packed data to generate corresponding intermediate data elements including at least A1*B1, A2*B2, A3*B3, A4*B4 intermediate data elements, said intermediate data elements being paired into a plurality of sets,
arithmetically combine the intermediate data elements in each of said plurality of sets to generate a plurality of result data elements respectively representing the addition of paired intermediate data elements including at least (A1*B1+A2*B2) and (A3*B3+A4*B4) result data elements, wherein each of said plurality of result data elements provides a higher precision than said initial data elements, and
store as a result of executing the multiply-add instruction said plurality of result data elements in the first register of said register file as a third 64-bit packed data, wherein each element in the third packed data is the result of a multiply-add operation on two pairs of corresponding initial data elements.

7. The microprocessor of claim 6, wherein the first register and the second register can be used to store packed data and can also be used as floating point registers to store floating point data.

8. The microprocessor of claim 7, wherein the first register and the second register are registers of a register file that contains eight registers.

9. The microprocessor of claim 8, wherein the circuit comprises a portion of an execution unit having a multiplier and an adder that can be enabled to perform a multiply-add operation on data accessed from said register file.

10. The microprocessor of claim 7, wherein bits fifteen through zero in both of said first and second 64-bit packed data are multiplied together to generate a first intermediate data element, bits thirty-one through sixteen in both of said first and second 64-bit packed data are multiplied together to generate a second intermediate data element, bits forty-seven through thirty-two in both of said first and second 64-bit packed data are multiplied together to generate a third intermediate data element, bits sixty-three through forty-eight in both of said first and second 64-bit packed data are multiplied together to generate a fourth intermediate data element, said first and second intermediate data elements are added generating a first result data element in bits thirty-one through zero of the third 64-bit packed data, and said third and fourth intermediate data elements are added generating a second result data element in bits sixty-three through thirty-two of the third 64-bit packed data.

11. A processor comprising:
a floating point register file to store floating point data;
a packed data register file to store a first vector data including a first operand filling a first register and having a first plurality of packed data elements, and a second vector data including a second operand filling a second register and including a second plurality of packed data elements;
a cache to store a packed multiply-sum instruction to operate on vector data, the packed multiply-sum instruction corresponding to a single packed multiply-sum opcode;
a decoder coupled to the cache to decode the packed multiply-sum instruction;
an execution unit to perform the packed multiply-sum instruction from the decoder to:
multiply in parallel each of the first plurality of packed data elements with a corresponding one of the second plurality of packed data elements to generate respective products therefrom;
sum products of corresponding packed data elements of the first and second vector data to generate a vector data result therefrom, the vector data result having a plurality of result packed data elements; and
saturation clamp each of the result packed data elements to a maximum value on overflow and to a minimum value on underflow;
wherein the packed multiply-sum opcode of the packed multiply-sum instruction is to operate on and generate packed data elements of a plurality of sizes including 16 bit packed data elements in the first plurality of packed data elements and in the second plurality of packed data elements, and 32 bit packed data elements in the result packed data elements; and
wherein the packed data register file is to store the vector data result as a third vector data having a third plurality of packed data elements in a third register, the third plurality of packed data elements corresponding to the result packed data elements.

12. The processor of claim 11, wherein:
the first plurality of packed data elements and the second plurality of packed data elements comprise unsigned elements each 8 bits in length;
the execution unit is to use the multiply-sum instruction to saturation clamp each of the result packed data elements to a maximum value of 65535 on overflow and to a minimum value of zero on underflow.

13. The processor of claim 11, wherein:
the first plurality of packed data elements and the second plurality of packed data elements comprise signed elements each 8 bits in length;
the execution unit is to use the multiply-sum instruction to saturation clamp each of the result packed data elements to a maximum value of 32767 on overflow and to a minimum value of −32768 on underflow.

14. The processor of claim 11, wherein the execution unit is to use the packed multiply-sum instruction to sum pairs of products of corresponding packed data elements of the first and second vector data to generate a vector data result therefrom.

15. The processor of claim 11, wherein the first plurality of packed data elements and the second plurality of packed data elements comprise unsigned elements each being 16 bits in length.

16. The processor of claim 11, wherein the first plurality of packed data elements and the second plurality of packed data elements comprise signed elements each being 16 bits in length.

17. The processor of claim 11, wherein the first plurality of packed data elements and the second plurality of packed data elements comprise unsigned elements each being 32 bits in length.

18. The processor of claim 11, wherein the first plurality of packed data elements and the second plurality of packed data elements comprise signed elements each being 32 bits in length.

19. A computer system comprising:
a processor comprising:
a floating point register file to store floating point data;
a packed data register file to store a first packed data including a first operand filling a first register and having a first plurality of packed data elements, and a second packed data including a second operand filling a second register and including a second plurality of packed data elements;
a cache to store a packed multiply-sum instruction to operate on vector data, the packed multiply-sum instruction corresponding to a single packed multiply-sum opcode;
a decoder coupled to the cache to decode the packed multiply-sum instruction;
an execution unit to perform the packed multiply-sum instruction from the decoder to:
multiply in parallel each of the first plurality of packed data elements with a corresponding one of the second plurality of packed data elements to generate respective products therefrom;
sum products of corresponding packed data elements of the first and second packed data to generate a packed data result therefrom, the packed data result having a plurality of result packed data elements; and
saturation clamp each of the result packed data elements to a maximum value on overflow and to a minimum value on underflow;
wherein the packed multiply-sum opcode of the packed multiply-sum instruction is to operate on and generate packed data elements of a plurality of sizes including 16 bit packed data elements in the first plurality of packed data elements and in the second plurality of packed data elements, and 32 bit packed data elements in the result packed data elements; and
wherein the packed data register file is to store the packed data result as a third packed data having a third plurality of packed data elements in a third register, the third plurality of packed data elements corresponding to the result packed data elements;
a bus coupled to the processor; and
a random access memory coupled to the bus.

20. The computer system of claim 19, wherein:
the first plurality of packed data elements and the second plurality of packed data elements comprise unsigned elements each 8 bits in length; and
the execution unit is to use the multiply-sum instruction to saturation clamp each of the result packed data elements to a maximum value of 65535 on overflow and to a minimum value of zero on underflow.

21. The computer system of claim 19, wherein:
the first plurality of packed data elements and the second plurality of packed data elements comprise signed elements each 8 bits in length; and
the execution unit is to use the multiply-sum instruction to saturation clamp each of the result packed data elements to a maximum value of 32767 on overflow and to a minimum value of −32768 on underflow.

22. The computer system of claim 19, wherein the execution unit is to use the packed multiply-sum instruction to sum pairs of products of corresponding packed data elements of the first and second packed data to generate a packed data result therefrom.

23. The computer system of claim 19, wherein the first plurality of packed data elements and the second plurality of packed data elements comprise unsigned elements each being 16 bits in length.

24. The computer system of claim 19, wherein the first plurality of packed data elements and the second plurality of packed data elements comprise signed elements each being 16 bits in length.

25. The computer system of claim 19, wherein the first plurality of packed data elements and the second plurality of packed data elements comprise unsigned elements each being 32 bits in length.

26. The computer system of claim 19, wherein the first plurality of packed data elements and the second plurality of packed data elements comprise signed elements each being 32 bits in length.

27. A computer readable medium storing computer executable instructions, which, when accessed, cause a machine to perform operations comprising:
storing floating point data in a floating point register;
storing a first vector data including a first operand filling a first register of a packed data register file and having a first plurality of packed data elements;
storing a second vector data including a second operand filling a second register of the packed data register file and having a second plurality of packed data elements;
decoding a packed multiply-sum instruction stored in a cache to operate on vector data, wherein the packed multiply-sum instruction corresponds to a single packed multiply-sum opcode;
performing the packed multiply-sum instruction after decoding including:
multiplying in parallel each of the first plurality of packed data elements with a corresponding one of the second plurality of packed data elements to generate respective products therefrom;
summing products of corresponding packed data elements of the first and second packed data to generate a packed data result therefrom, the packed data result having a plurality of result packed data elements; and
saturation clamping the result packed data elements to a maximum value on overflow and to a minimum value on underflow;
wherein the packed multiply-sum opcode of the packed multiply-sum instruction is to operate on elements of a plurality of sizes including 16 bit packed data elements in the first plurality of packed data elements and in the second plurality of packed data elements; and
storing the packed data result in a third register of the packed data register file as a third packed data having a third plurality of packed data elements, the third plurality of packed data elements corresponding to the result packed data elements.

28. The computer readable medium of claim 27, wherein:
the first plurality of packed data elements and the second plurality of packed data elements comprise unsigned elements each 8 bits in length;
saturation clamping includes saturation clamping each of the result packed data elements to a maximum value of 65535 on overflow and to a minimum value of zero on underflow.

29. The computer readable medium of claim 27, wherein:
the first plurality of packed data elements and the second plurality of packed data elements comprise signed elements each 8 bits in length;
saturation clamping includes saturation clamping each of the result packed data elements to a maximum value of 32767 on overflow and to a minimum value of −32768 on underflow.

30. The computer readable medium of claim 27, wherein summing includes summing pairs of products of corresponding packed data elements of the first and second packed data to generate a packed data result therefrom.

31. The computer readable medium of claim 27, wherein the first plurality of packed data elements and the second plurality of packed data elements comprise unsigned elements each being 16 bits in length.

32. The computer readable medium of claim 27, wherein the first plurality of packed data elements and the second plurality of packed data elements comprise signed elements each being 16 bits in length.

33. The computer readable medium of claim 27, wherein the first plurality of packed data elements and the second plurality of packed data elements comprise unsigned elements each being 32 bits in length.

34. The computer readable medium of claim 27, wherein the first plurality of packed data elements and the second plurality of packed data elements comprise signed elements each being 32 bits in length.

35. A processor comprising:
a register file having a plurality of registers;
a decoder coupled with the register file, the decoder to decode a first instruction, the first instruction having a 32-bit instruction format, the first instruction having a first field to identify a first source register of the register file that is to store a first plurality of signed packed data elements and a second field to identify a second source register of the register file that is to store a second plurality of signed packed data elements, the first plurality of signed packed data elements to include four data elements A1, A2, A3 and A4, the second plurality of signed packed data elements to include data elements B1 and B2, wherein B1 and B2 are to be 16-bit data elements; and
an execution unit coupled with the decoder, the execution unit to store two result data elements in response to the first instruction in a destination identified by the first instruction, each of the two result data elements to include a sum of products of data elements of the first and second pluralities of signed packed data elements, one of the two result data elements being (A1×B1)+(A2×B2), wherein each of the two result data elements is a 32-bit data element.

36. The processor of claim 35, wherein the first instruction is to perform a dot product calculation.

37. The processor of claim 35, wherein the execution unit is to form a product A1×B1 by performing a 16-bit by 16-bit multiplication.

38. The processor of claim 35, wherein the execution unit is to perform four simultaneous multiplications and two additions to generate the two result data elements.

39. The processor of claim 35, wherein the processor comprises a central processing unit.

40. The processor of claim 35, wherein the processor is operable to perform a plurality of other instructions including a packed add instruction, a packed subtract instruction, and a packed multiply instruction.

41. The processor of claim 40, wherein the processor is further operable to perform a packed shift instruction and a packed compare instruction.

42. A system comprising:
a bus;
a microphone coupled with the bus;
a speaker coupled with the bus; and
a processor coupled with the bus, the processor comprising:
a register file having a plurality of registers;
a decoder coupled with the register file, the decoder to decode a first instruction, the first instruction having a 32-bit instruction format, the first instruction having a first field to identify a first source register of the register file that is to store a first plurality of signed packed data elements and a second field to identify a second source register of the register file that is to store a second plurality of signed packed data elements, the first plurality of signed packed data elements to include four data elements A1, A2, A3 and A4, the second plurality of signed packed data elements to include data elements B1 and B2, wherein B1 and B2 are to be 16-bit data elements; and
an execution unit coupled with the decoder, the execution unit to store two result data elements in response to the first instruction in a destination identified by the first instruction, each of the two result data elements to include a sum of products of data elements of the first and second pluralities of signed packed data elements, one of the two result data elements being (A1×B1)+(A2×B2), wherein each of the two result data elements is a 32-bit data element.

43. The system of claim 42, wherein the first instruction is to perform a dot product calculation.

44. The system of claim 42, wherein the processor is operable to perform a plurality of other instructions including a packed add instruction, a packed subtract instruction, a packed multiply instruction, a packed shift instruction, and a packed compare instruction.

45. The system of claim 42, further comprising a touch screen user input device coupled with the bus.

46. The system of claim 42, further comprising a video digitizing device coupled with the bus, the video digitizing device to capture video images.

47. A system comprising:
a processor comprising:
a register file having a plurality of registers;
a decoder coupled with the register file, the decoder to decode a first instruction, the first instruction having a 32-bit instruction format, the first instruction having a first field to identify a first source register of the register file that is to store a first plurality of signed packed data elements and a second field to identify a second source register of the register file that is to store a second plurality of signed packed data elements, the first plurality of signed packed data elements to include four data elements A1, A2, A3 and A4, the second plurality of signed packed data elements to include data elements B1 and B2, wherein B1 and B2 are to be 16-bit data elements; and
an execution unit coupled with the decoder, the execution unit to store two result data elements in response to the first instruction in a destination identified by the first instruction, each of the two result data elements to include a sum of products of data elements of the first and second pluralities of signed packed data elements, one of the two result data elements being (A1×B1)+(A2×B2), wherein each of the two result data elements is a 32-bit data element; and
a communications hardware coupled with the processor, wherein the communications hardware is further operable to couple devices comprising:
a microphone; and
a speaker.

48. The system of claim 47, wherein the first instruction is to perform a dot product calculation.

49. The system of claim 47, wherein the processor is operable to perform a plurality of other instructions including a packed add instruction, a packed subtract instruction, a packed multiply instruction, a packed shift instruction, and a packed compare instruction.

50. The system of claim 47, wherein the communications hardware is further operable to couple a touch screen user input device.

51. The system of claim 47, wherein the communications hardware is further operable to couple a video digitizing device, the video digitizing device to capture video images.

* * * * *